United States Patent
Tabata et al.

(10) Patent No.: US 11,447,110 B2
(45) Date of Patent: Sep. 20, 2022

(54) ELECTRIC VEHICLE AND METHOD FOR CONTROLLING ELECTRIC VEHICLE

(71) Applicant: TOYOTA JIDOSHA KABUSHIKI KAISHA, Toyota (JP)

(72) Inventors: Atsushi Tabata, Okazaki (JP); Koichi Okuda, Toyota (JP); Tooru Matsubara, Toyota (JP); Yuuki Makino, Aichi-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 166 days.

(21) Appl. No.: 17/014,392

(22) Filed: Sep. 8, 2020

(65) Prior Publication Data

US 2021/0070266 A1   Mar. 11, 2021

(30) Foreign Application Priority Data

Sep. 9, 2019   (JP) .............................. JP2019-163895

(51) Int. Cl.
*B60T 8/1769*   (2006.01)
*B60K 1/00*   (2006.01)
(Continued)

(52) U.S. Cl.
CPC .............. *B60T 8/1769* (2013.01); *B60K 1/00* (2013.01); *B60K 17/22* (2013.01); *B60K 17/34* (2013.01);
(Continued)

(58) Field of Classification Search
None
See application file for complete search history.

(56) References Cited

U.S. PATENT DOCUMENTS 5,547,433 A * 8/1996 Yang .................... B60W 20/00
 903/951
5,895,100 A * 4/1999 Ito ........................ B60T 13/586
 303/3
(Continued)

FOREIGN PATENT DOCUMENTS

CN    108099615 A  *  6/2018  ................ B60L 7/22
DE  102015122022 A1 *  3/2017  .......... B60L 15/2009
(Continued)

OTHER PUBLICATIONS

Notice of Reasons for Refusal JP 2019163895 (Year: 2022).*
Search Report JP 2019163895 (Year: 2022).*

*Primary Examiner* — Dirk Wright
(74) *Attorney, Agent, or Firm* — Hunton Andrews Kurth LLP

(57) ABSTRACT

When braking of the electric vehicle is performed, the braking is controlled based on a target braking split ratio which is a target value of the ratio of the braking force that is applied to the rear wheels to a total braking force that is applied to the front and rear wheels. In this case, an initial value of the target braking split ratio is set to a value within an allowable range about a transmission split ratio when braking of the electric vehicle is started while the electric vehicle is being braked by the motor, the transmission split ratio being the ratio of a braking force that is transmitted from a drive shaft to the rear wheels via a driving force split device to a total braking force that is transmitted from the drive shaft to the front and rear wheels via the driving force split device.

8 Claims, 9 Drawing Sheets

(51) Int. Cl.
  *B60L 15/20* (2006.01)
  *B60K 17/22* (2006.01)
  *B60K 23/08* (2006.01)
  *B60K 17/34* (2006.01)
  *B60K 6/52* (2007.10)

(52) U.S. Cl.
  CPC ...... *B60K 23/0808* (2013.01); *B60L 15/2009* (2013.01); *B60K 6/52* (2013.01); *B60Y 2200/91* (2013.01); *B60Y 2200/92* (2013.01); *B60Y 2400/82* (2013.01)

(56) References Cited

U.S. PATENT DOCUMENTS

| | | | | |
|---|---|---|---|---|
| 6,454,364 | B1 * | 9/2002 | Niwa | B60W 30/18127 |
| | | | | 303/3 |
| 6,598,945 | B2 * | 7/2003 | Shimada | B60W 20/13 |
| | | | | 303/3 |
| 6,811,229 | B2 * | 11/2004 | Soga | B60K 7/18 |
| | | | | 303/3 |
| 6,930,405 | B2 * | 8/2005 | Gunji | B60K 6/44 |
| | | | | 290/40 C |
| 6,957,874 | B2 * | 10/2005 | Hara | B60K 6/543 |
| | | | | 180/165 |
| 6,988,779 | B2 * | 1/2006 | Amanuma | B60K 6/52 |
| | | | | 180/65.225 |
| 8,255,137 | B2 * | 8/2012 | Jinno | B60L 58/12 |
| | | | | 701/79 |
| 8,277,365 | B2 * | 10/2012 | Ohbayashi | B60L 7/26 |
| | | | | 477/29 |
| 8,371,413 | B2 * | 2/2013 | Hayashi | B60K 6/52 |
| | | | | 180/242 |
| 8,388,071 | B2 * | 3/2013 | Yokoyama | B60T 1/10 |
| | | | | 303/151 |
| 8,535,189 | B2 * | 9/2013 | Yoshimura | B60W 10/06 |
| | | | | 475/5 |
| 8,700,241 | B2 * | 4/2014 | Yoshimura | B60L 15/2054 |
| | | | | 701/22 |
| 9,707,944 | B2 * | 7/2017 | Doi | B60T 8/1766 |
| 10,131,232 | B2 * | 11/2018 | Jeon | B60L 15/2009 |
| 10,189,477 | B2 * | 1/2019 | Morisaki | B60W 20/13 |
| 10,569,657 | B2 * | 2/2020 | Yamamoto | B60T 8/267 |
| 2004/0070270 | A1 * | 4/2004 | Gunji | B60L 7/10 |
| | | | | 903/917 |
| 2016/0144855 | A1 * | 5/2016 | Saito | B60W 10/06 |
| | | | | 701/70 |
| 2016/0264111 | A1 | 9/2016 | Doi et al. | |
| 2018/0148059 | A1 | 5/2018 | Morisaki | |

FOREIGN PATENT DOCUMENTS

| | | | | |
|---|---|---|---|---|
| EP | 1449700 | A2 * | 8/2004 | |
| EP | 1979185 | B1 * | 1/2017 | ............ B60K 6/445 |
| JP | 2000043696 | A | 2/2000 | |
| JP | 2007284001 | A * | 11/2007 | |
| JP | 2011-218871 | A | 11/2011 | |
| JP | 2011218871 | A * | 11/2011 | |
| JP | 2018-086933 | A | 6/2018 | |
| WO | WO-2007025926 | A1 * | 3/2007 | ......... B60K 23/0808 |
| WO | 2015068800 | A1 | 5/2015 | |

* cited by examiner

|  | C1 | C2 | B1 | B2 | F1 |
|---|---|---|---|---|---|
| 1st | O | – | – | (O) | O |
| 2nd | O | – | O | – | – |
| 3rd | O | O | – | – | – |
| 4th | – | O | O | – | – |
| R. | O | – | – | O | – |

* "O": ENGAGED, "–": DISENGAGED

ELECTRIC VEHICLE AND METHOD FOR CONTROLLING ELECTRIC VEHICLE

CROSS-REFERENCE TO RELATED APPLICATION

This application claims priority to Japanese Patent Application No. 2019-163895 filed on Sep. 9, 2019, incorporated herein by reference in its entirety.

BACKGROUND

1. Technical Field

The disclosure relates to an electric vehicle and a method for controlling an electric vehicle.

2. Description of Related Art

Conventionally, an electric vehicle is proposed which includes: a motor connected to a drive shaft coupled to drive wheels; and a hydraulic brake device capable of applying a hydraulic braking force to the drive wheels and sub drive wheels and which applies a braking force from the motor or the hydraulic brake device to the vehicle based on driver's brake operation (see, e.g., Japanese Unexamined Patent Application Publication No. 2018-86933 (JP 62018-86933 A)). In this electric vehicle, when the braking force by the motor is not sufficient for a target braking force that is based on driver's brake operation, the hydraulic brake device covers the shortage of the braking force. Moreover, when this electric vehicle is about to stop while a braking force is being applied thereto, the vehicle braking force by the motor is replaced with a vehicle braking force by the hydraulic brake device.

A vehicle is also proposed which includes: an engine; a transmission coupled to the engine; and a transfer case coupled to the transmission, a front propeller shaft coupled to front wheels that are sub drive wheels, and a rear propeller shaft coupled to rear wheels that are main drive wheels (see, e.g., Japanese Unexamined Patent Application Publication No. 2011-218871 (JP 2011-218871 A)). The transfer case is capable of continuously changing the front-to-rear driving force split between, e.g., 0:100 and 50:50. The front-to-rear driving force split indicates how the driving force that is output from the engine via the transmission is split between the front wheels and the rear wheels.

SUMMARY

Some recent electric vehicles have such a hardware configuration that parts on the drive wheel side of the drive shaft of the electric vehicle described in JP 2018-86933 A are replaced with the transfer case, the front propeller shaft, the front wheels, the rear propeller shaft, the rear wheels, etc. of JP 2011-218871 A. In this hardware configuration, the vehicle attitude changes in the case where the split ratio of the vehicle braking force by the motor between the front and rear wheels is significantly different from that of the vehicle braking force by the hydraulic brake device between the front and rear wheels when, e.g., the vehicle braking force by the motor is replaced with the vehicle braking force by the hydraulic brake device as described in JP 2018-86933 A. Such a change in vehicle attitude may cause deterioration in drivability.

The disclosure provides an electric vehicle and a method for controlling an electric vehicle which reduce deterioration in drivability.

A first aspect of the disclosure relates to an electric vehicle including a motor, a driving force split device, a braking force applying device, and a controller. The motor is connected to a drive shaft. The driving force split device is configured to transmit a driving force from the drive shaft to a front wheel and a rear wheel and to adjust a transmission split ratio. The transmission split ratio is a ratio of the driving force that is transmitted from the drive shaft to the rear wheel via the driving force split device to a total driving force that is transmitted from the drive shaft to the front wheel and the rear wheel via the driving force split device. The braking force applying device is configured to apply a braking force to the front wheel and the rear wheel. The controller is configured to control the braking force applying device based on a target braking split ratio when braking of the electric vehicle by the braking force applying device is performed. The target braking split ratio is a target value of a ratio of the braking force that is applied to the rear wheel by the braking force applying device to a total braking force that is applied to the front wheel and the rear wheel by the braking force applying device. The controller is configured to set an initial value of the target braking split ratio to a value within an allowable range about the transmission split ratio when braking of the electric vehicle by the braking force applying device is started while the electric vehicle is being braked by the motor.

A second aspect of the disclosure relates to a method for controlling an electric vehicle including a motor, a driving force split device, and a braking force applying device. The motor is connected to a drive shaft. The driving force split device is configured to transmit a driving force from the drive shaft to a front wheel and a rear wheel and to adjust a transmission split ratio. The transmission split ratio is a ratio of the driving force that is transmitted from the drive shaft to the rear wheel via the driving force split device to a total driving force that is transmitted from the drive shaft to the front wheel and the rear wheel via the driving force split device. The braking force applying device is configured to apply a braking force to the front wheel and the rear wheel. The method includes: controlling the braking force applying device based on a target braking split ratio when braking of the electric vehicle by the braking force applying device is performed, the target braking split ratio being a target value of a ratio of the braking force that is applied to the rear wheel by the braking force applying device to a total braking force that is applied to the front wheel and the rear wheel by the braking force applying device; and setting an initial value of the target braking split ratio to a value within an allowable range about the transmission split ratio when braking of the electric vehicle by the braking force applying device is started while the electric vehicle is being braked by the motor.

According to the electric vehicle of the first aspect of the disclosure and the method for controlling an electric vehicle of the second aspect of the disclosure, when braking of the electric vehicle by the braking force applying device is performed, the braking force applying device is controlled based on the target braking split ratio, the target braking split ratio being a target value of the ratio (braking split ratio) of the braking force that is applied to the rear wheel by the braking force applying device to a total braking force that is applied to the front wheel and the rear wheel by the braking force applying device. At this time, when braking of the electric vehicle by the braking force applying device is started while the electric vehicle is being braked by the motor, the initial value of the target braking split ratio is set to a value within the allowable range about the transmission split ratio, the transmission split ratio being the ratio of the driving force (braking force) that is transmitted from the drive shaft to the rear wheel via the driving force split device to a total driving force (total braking force) that is transmitted from the drive shaft to the front wheel and the rear wheel via the driving force split device. The split of the braking force between the front and rear wheels is thus restrained from being significantly different before and after braking of the electric vehicle by the braking force applying device is started. As a result, the electric vehicle attitude is restrained from changing before and after braking of the electric vehicle by the braking force applying device is started, and deterioration in drivability is reduced. Examples of "when braking of the electric vehicle by the braking force applying device is started while the electric vehicle is being braked by the motor" include when the electric vehicle braking force by the motor is replaced with the electric vehicle braking force by the braking force applying device and when braking of the electric vehicle by the braking force applying device is performed in addition to braking of the electric vehicle by the motor.

In the electric vehicle of the first aspect, the controller may be configured to set the initial value of the target braking split ratio to the transmission split ratio when braking of the electric vehicle by the braking force applying device is started while the electric vehicle is being braked by the motor. According to the electric vehicle with the above configuration, the split of the braking force between the front and rear wheels can be made to be the same before and after braking of the electric vehicle by the braking force applying device is started. As a result, the electric vehicle attitude is more sufficiently restrained from changing before and after braking of the electric vehicle by the braking force applying device is started, and deterioration in drivability is more sufficiently reduced.

In the electric vehicle of the first aspect, the controller may be configured to gradually change the target braking split ratio toward a requested split ratio that is requested for the braking force applying device, after braking of the electric vehicle by the braking force applying device is started while the electric vehicle is being braked by the motor. According to the electric vehicle with the above configuration, the target braking split ratio can be gradually changed, and a change in vehicle attitude is restrained.

In the electric vehicle of the first aspect, the controller may be configured to set the target braking split ratio to the transmission split ratio until a replacement process is completed after braking of the electric vehicle by the braking force applying device is started while the electric vehicle is being braked by the motor. The replacement process is a process of replacing a vehicle braking force by the motor with a vehicle braking force by the braking force applying device. According to the electric vehicle with the above configuration, the target braking split ratio is restrained from changing until the replacement process is completed (during the replacement process) after braking of the electric vehicle by the braking force applying device is started. The target braking split ratio can be made constant especially when the transmission split ratio is constant.

In the electric vehicle of the first aspect, the controller may be configured to set the initial value of the target braking split ratio to a requested split ratio that is requested for the braking force applying device, in a case where an absolute value of a requested braking force that is requested for the electric vehicle is equal to or larger than a predetermined braking force when braking of the electric vehicle by the braking force applying device is started while the electric vehicle is being braked by the motor. The controller may be configured to set the initial value of the target braking split ratio to a requested split ratio that is requested for the braking force applying device, in a case where a vehicle body speed is equal to or higher than a predetermined vehicle body speed when braking of the electric vehicle by the braking force applying device is started while the electric vehicle is being braked by the motor. The controller may be configured to set the initial value of the target braking split ratio to a requested split ratio that is requested for the braking force applying device, in a case where the electric vehicle is making a turn traveling when braking of the electric vehicle by the braking force applying device is started while the electric vehicle is being braked by the motor. According to the electric vehicle with the above configuration, in the case where sudden braking of the electric vehicle is requested, the electric vehicle is traveling at relatively high speeds, or the electric vehicle is making a turn traveling, performing such control is considered to be more advantageous for stability of the electric vehicle behavior than setting the initial value of the target braking split ratio to a value within the allowable range about the transmission split ratio. In these cases, the requested split ratio is, e.g., 0.5.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A mode for carrying out the disclosure will be described based on an embodiment.

Figure 1:
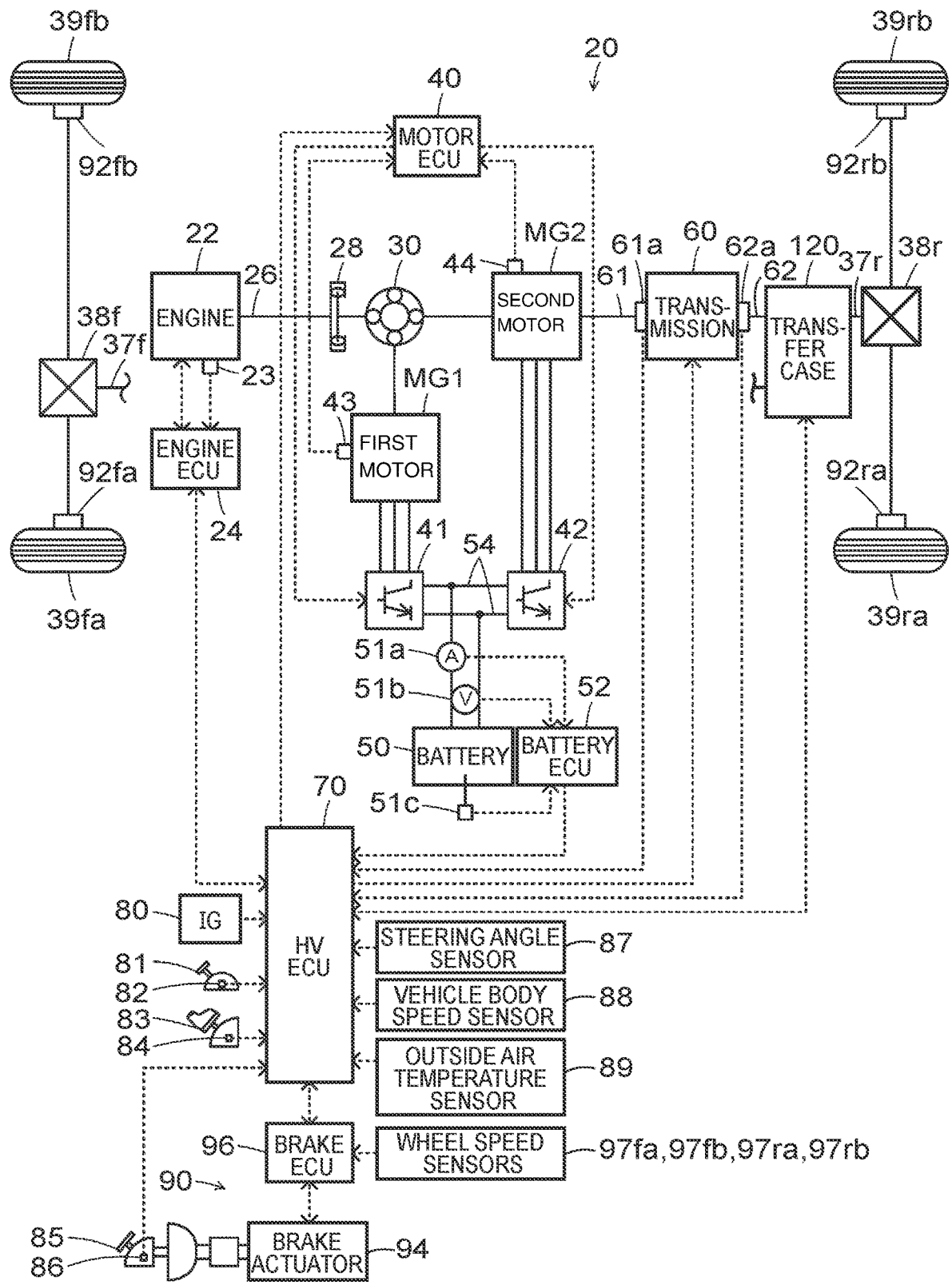
FIG. 1 is a configuration diagram illustrating the general configuration of a hybrid car as an example of an electric vehicle according to an embodiment of the disclosure.
Figure 2:
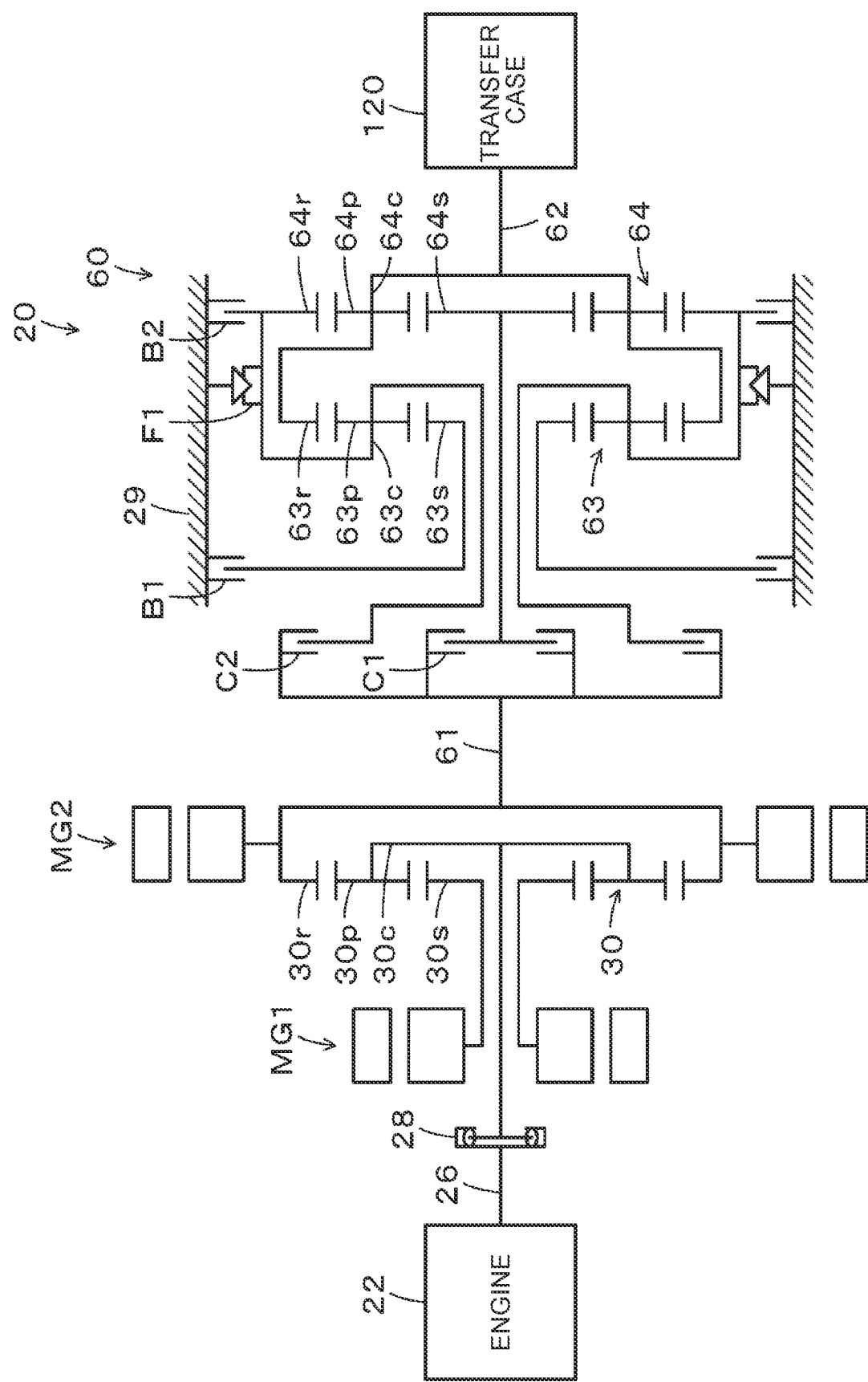
FIG. 2 is a configuration diagram illustrating the general configuration of an engine, a planetary gear, a first motor, a second motor, and a transmission shown in FIG. 1.

FIG. 1 is a configuration diagram illustrating the general configuration of a hybrid car 20 as an example of an electric vehicle according to an embodiment of the disclosure. FIG. 2 is a configuration diagram illustrating the general configuration of an engine 22, a planetary gear 30, a first motor MG1, a second motor MG2, and a transmission 60. The hybrid car 20 of the embodiment is configured as a rear-wheel drive based four-wheel drive vehicle in which rear wheels 39ra, 39rb are main drive wheels and front wheels 39fa, 39fb are sub drive wheels. As shown in FIGS. 1 and 2, the hybrid car 20 includes the engine 22, the planetary gear 30, the first motor MG1, the second motor MG2, a first inverter 41, a second inverter 42, a battery 50, the transmission 60, a transfer case 120, a hydraulic brake device 90, and a hybrid electronic control unit (HV ECU) 70. The hybrid car 20 is an example of the "electric vehicle" of the disclosure.

The engine 22 is configured as an internal combustion engine that outputs power using gasoline, light oil, etc. as fuel. An engine electronic control unit (engine ECU) 24 controls operation of the engine 22.

Although not shown in the figures, the engine ECU 24 is configured as a microprocessor mainly composed of a center processing unit (CPU). The engine ECU 24 includes, in addition to the CPU, a ROM that stores processing programs, a RAM that temporarily stores data, input and output ports, and a communication port. The engine ECU 24 receives, via the input port, signals from various sensors which are necessary to control operation of the engine 22. An example of the signals that are input to the engine ECU 24 is a crank angle $\theta cr$ of a crankshaft 26 of the engine 22 from a crank position sensor 23 that detects the rotational position of the crankshaft 26 of the engine 22. The engine ECU 24 outputs, via the output port, various control signals for controlling operation of the engine 22. The engine ECU 24 is connected to the HV ECU 70 via the communication port. The engine ECU 24 calculates a rotational speed Ne of the engine 22 based on the crank angle $\theta cr$ from the crank position sensor 23.

The planetary gear 30 is configured as a single-pinion planetary gear mechanism. The planetary gear 30 has a sun gear 30s that is an external gear, a ring gear 30r that is an internal gear, a plurality of pinion gears 30p meshing with the sun gear 30s and the ring gear 30r, a carrier 30c that supports the pinion gears 30p such that the pinion gears 30p can rotate (turn) and revolve. The sun gear 30s is connected to a rotor of the first motor MG1. The ring gear 30r is connected to an input shaft 61 of the transmission 60. The carrier 30c is connected to the crankshaft 26 of the engine 22 via a damper 28.

The first motor MG1 is configured as, e.g., a synchronous generator motor. As described above, the rotor of the first motor MG1 is connected to the sun gear 30s of the planetary gear 30. The second motor MG2 is configured as, e.g., a synchronous generator motor. A rotor of the second motor MG2 is connected to the input shaft 61 of the transmission 60. The first inverter 41 and the second inverter 42 are used to drive the first motor MG1 and the second motor MG2 and are connected to the battery 50 via power lines 54. A motor electronic control unit (motor ECU) 40 controls switching of a plurality of switching elements, not shown, of the first inverter 41 and a plurality of switching elements, not shown, of the second inverter 42 to rotationally drive the first motor MG1 and the second motor MG2.

Although not shown in the figures, the motor ECU 40 is configured as a microprocessor mainly composed of a CPU. The motor ECU 40 includes, in addition to the CPU, a ROM that stores processing programs, a RAM that temporarily stores data, input and output ports, and a communication port. The motor ECU 40 receives, via the input port, signals from various sensors which are necessary to control driving of the first and second motors MG1, MG2. Examples of the signals that are input to the motor ECU 40 include: rotational positions $\theta m1$, $\theta m2$ of the rotors of the first and second motors MG1, MG2 from a first rotational position sensor 43 and a second rotational position sensor 44 which detect the rotational positions of the rotors of the first and second motors MG1, MG2, respectively; and phase currents Iu1, Iv1, Iu2, Iv2 of each phase of the first and second motors MG1, MG2 from current sensors that detect a phase current flowing in each phase of the first and second motors MG1, MG2. The motor ECU 40 outputs, via the output port, signals such as switching control signals for the switching elements, not shown, of the first and second inverters 41, 42. The motor ECU 40 is connected to the HV ECU 70 via the communication port. The motor ECU 40 calculates electrical angles $\theta e1$, $\theta e2$ and rotational speeds Nm1, Nm2 of the first and second motors MG1, MG2 based on the rotational positions $\theta m1$, $\theta m2$ of the rotors of the first and second motors MG1, MG2 from the first and second rotational position sensors 43, 44.

The battery 50 is configured as, e.g., a lithium-ion secondary battery or a nickel-hydrogen secondary battery. As described above, the battery 50 is connected to the first and second inverters 41, 42 via the power lines 54. A battery electronic control unit (battery ECU) 52 manages the battery 50.

Although not shown in the figures, the battery ECU 52 is configured as a microprocessor mainly composed of a CPU. The battery ECU 52 includes, in addition to the CPU, a ROM that stores processing programs, a RAM that temporarily stores data, input and output ports, and a communication port. The battery ECU 52 receives, via the input port, signals from various sensors which are necessary to manage the battery 50. Examples of the signals that are input to the battery ECU 52 include: a current Ib (which takes a positive value when power is discharged from the battery 50) of the battery 50 from a current sensor 51a attached to an output terminal of the battery 50; a voltage Vb of the battery 50 from a voltage sensor 51b attached between terminals of the battery 50; and a temperature Tb of the battery 50 from a temperature sensor 51c attached to the battery 50. The battery ECU 52 is connected to the HV ECU 70 via the communication port. The battery ECU 52 calculates a state of charge SOC of the battery 50 based on an integrated value of the current Ib of the battery 50 from the current sensor 51a. The state of charge SOC is the ratio of the remaining capacity that can be discharged from the battery 50 to the maximum capacity of the battery 50. The battery ECU 52 also calculates input and output limits Win, Wout of the battery 50 based on the state of charge SOC of the battery 50 and the temperature Tb of the battery 50 from the temperature sensor 51c. The input limit Win is maximum allowable power (negative value) with which the battery 50 can be charged, and the output limit Wout is maximum allowable power (positive value) that can be discharged from the battery 50.

The transmission 60 is configured as a four-gear transmission. The transmission 60 includes the input shaft 61, an output shaft (drive shaft) 62, a first planetary gear 63, a second planetary gear 64, a first clutch C1, a second clutch C2, a first brake B1, a second brake B2, and a one-way clutch F1. As described above, the input shaft 61 is connected to the ring gear 30*r* of the planetary gear 30 and the second motor MG2. The output shaft 62 is connected to the transfer case 120.

The first planetary gear 63 is configured as a single-pinion planetary gear mechanism. The first planetary gear 63 has a sun gear 63*s* that is an external gear, a ring gear 63*r* that is an internal gear, a plurality of pinion gears 63*p* meshing with the sun gear 63*s* and the ring gear 63*r*, and a carrier 63*c* that supports the pinion gears 63*p* such that the pinion gears 63*p* can rotate (turn) and revolve.

The second planetary gear 64 is configured as a single-pinion planetary gear mechanism. The second planetary gear 64 has a sun gear 64*s* that is an external gear, a ring gear 64*r* that is an internal gear, a plurality of pinion gears 64*p* meshing with the sun gear 64*s* and the ring gear 64*r*, and a carrier 64*c* that supports the pinion gears 64*p* such that the pinion gears 64*p* can rotate (turn) and revolve.

The carrier 63*c* of the first planetary gear 63 and the ring gear 64*r* of the second planetary gear 64 are coupled (fixed) together. The ring gear 63*r* of the first planetary gear 63 and the carrier 64*c* of the second planetary gear 64 are coupled (fixed) together. Accordingly, the first and second planetary gears 63, 64 function as a four-element mechanism having four rotary elements: the sun gear 63*s* of the first planetary gear 63, the carrier 63*c* of the first planetary gear 63 and the ring gear 64*r* of the second planetary gear 64, the ring gear 63*r* of the first planetary gear 63 and the carrier 64*c* of the second planetary gear 64, and the sun gear 64*s* of the second planetary gear 64. The ring gear 63*r* of the first planetary gear 63 and the carrier 64*c* of the second planetary gear 64 are coupled (fixed) to the output shaft 62.

The first clutch C1 connects and disconnects the input shaft 61 to and from the sun gear 64*s* of the second planetary gear 64. The second clutch C2 connects and disconnects the input shaft 61 to and from the carrier 63*c* of the first planetary gear 63 and the ring gear 64*r* of the second planetary gear 64. The first brake B1 fixes (connects) the sun gear 63*s* of the first planetary gear 63 to a transmission case 29 that is a stationary member such that the sun gear 63*s* is not rotatable relative to the transmission case 29. The first brake B1 also releases the sun gear 63*s* from the transmission case 29 such that the sun gear 63*s* is rotatable relative to the transmission case 29. The second brake B2 fixes (connects) the carrier 63*c* of the first planetary gear 63 and the ring gear 64*r* of the second planetary gear 64 to the transmission case 29 such that the carrier 63*c* and the ring gear 64*r* are not rotatable relative to the transmission case 29. The second brake B2 also releases the carrier 63*c* and the ring gear 64*r* from the transmission case 29 such that the carrier 63*c* and the ring gear 64*r* are rotatable relative to the transmission case 29. The one-way clutch F1 allows the carrier 63*c* of the first planetary gear 63 and the ring gear 64*r* of the second planetary gear 64 to rotate in one direction and restricts rotation of the carrier 63*c* and the ring gear 64*r* in the other direction.

The first clutch C1 and the second clutch C2 are each configured as a hydraulically driven multi-disc clutch. The first brake B1 and the second brake B2 are each configured as a hydraulically driven multi-disc brake. The first and second clutches C1, C2 and the first and second brakes B1, B2 operate when a hydraulic controller (not shown) supplies and discharges hydraulic oil to and from the first and second clutches C1, C2 and the first and second brakes B1, B2.

Figures 3, 4:
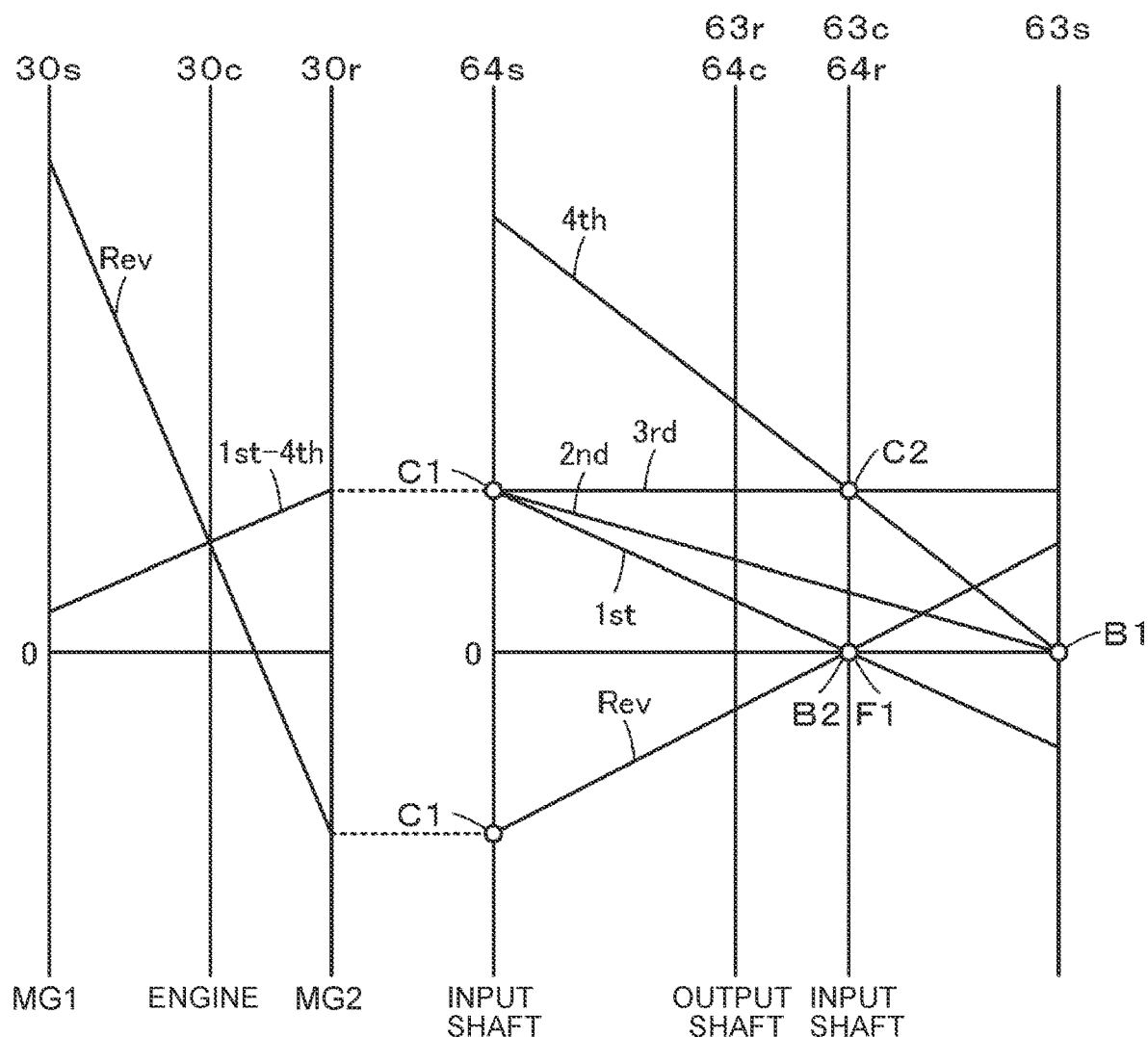
FIG. 3 is an operation table illustrating the relationship between each gear stage of the transmission shown in FIG. 2 and the operating states of a first clutch, a second clutch, a first brake, a second brake, and a one-way clutch.
FIG. 4 is a collinear chart illustrating the relationship among the rotational speeds of rotary elements of the planetary gear and the transmission.

FIG. 3 is an operation table illustrating the relationship between each gear stage of the transmission 60 and the operating states of the first clutch C1, the second clutch C2, the first brake B1, the second brake B2, and the one-way clutch F1. FIG. 4 is a collinear chart illustrating the relationship among the rotational speeds of the rotary elements of the planetary gear 30 and the transmission 60. The transmission 60 attains forward gears from first gear to fourth gear and a reverse gear by engaging or disengaging the first clutch C1, the second clutch C2, the first brake B1, the second brake B2, and the one-way clutch F1 as shown in FIG. 3.

Specifically, first forward gear is attained by engaging the first clutch C1, disengaging the second clutch C2, the first brake B1, and the second brake B2, and operating the one-way clutch F1 (causing the one-way clutch F1 to restrict the rotation of the carrier 63*c* of the first planetary gear 63 and the ring gear 64*r* of the second planetary gear 64 in the other direction (negative rotation in FIG. 4)). In first forward gear, the second brake B2 is also engaged when a braking force is output to the input shaft 61 of the transmission 60 due to regenerative driving of the second motor MG2 or motoring of the engine 22 having stopped fuel injection by the first motor MG1.

Second forward gear is attained by engaging the first clutch C1 and the first brake B1 and disengaging the second clutch C2 and the second brake B2. Third forward gear is attained by engaging the first clutch C1 and the second clutch C2 and disengaging the first brake B1 and the second brake B2. Fourth forward gear is attained by engaging the second clutch C2 and the first brake B1 and disengaging the first clutch C1 and the second brake B2. Reverse gear is attained by engaging the first clutch C1 and the second brake B2 and disengaging the second clutch C2 and the first brake B1.

The transfer case 120 is capable of continuously changing the front-to-rear driving force split between, e.g., 0:100 and 50:50. The front-to-rear driving force split indicates how the driving force that is output to the output shaft 62 of the transmission 60 is split between the front wheels 39*fa*, 39*fb* that are sub drive wheels and the rear wheels 39*ra*, 39*rb* that are main drive wheels. Accordingly, the hybrid car 20 is in two-wheel drive (2WD) mode when the front-to-rear driving force split is 0:100, and is in four-wheel drive (4WD) mode when the front-to-rear driving force split is other than 0:100. That is, the hybrid car 20 is configured as a part-time 4WD car.

Figure 5:
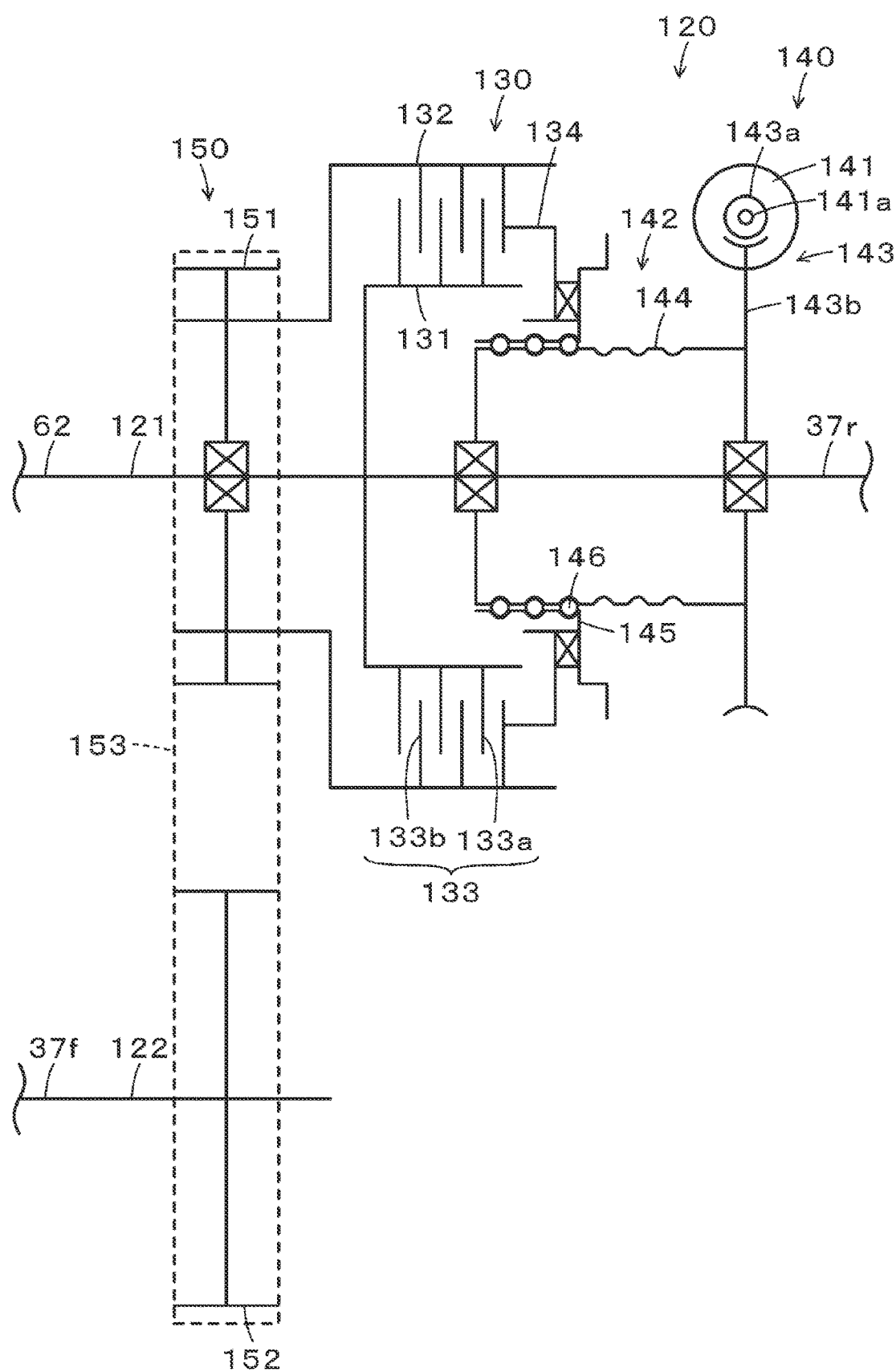
FIG. 5 is a configuration diagram illustrating the general configuration of a transfer case shown in FIG. 1.

FIG. 5 is a configuration diagram illustrating the general configuration of the transfer case 120. As shown in the figure, the transfer case 120 includes a rear wheel-side transmission shaft 121, a front wheel-side transmission shaft 122, a third clutch 130, a drive unit 140, and a transmission mechanism 150. The rear wheel-side transmission shaft 121 is coupled to the output shaft 62 of the transmission 60 (see FIG. 1) and is also coupled to a rear propeller shaft 37*r* (see FIG. 1). The front wheel-side transmission shaft 122 is coupled to a front propeller shaft 37*f* (see FIG. 1).

The third clutch 130 is configured as a multi-disc clutch. The third clutch 130 includes a clutch hub 131, a clutch drum 132, a plurality of friction engagement plates 133, and a piston 134. The clutch hub 131 is coupled to the rear wheel-side transmission shaft 121. The clutch drum 132 is coupled to a drive gear 151 of the transmission mechanism 150. The friction engagement plates 133 are disposed such that first plates 133a that are spline-fitted to the outer peripheral surface of the clutch hub 131 and second plates 133b that are spline-fitted to the inner peripheral surface of the clutch drum 132 are alternately arranged. The piston 134 is placed on the opposite side of the friction engagement plates 133 from the drive gear 151 of the transmission mechanism 150. The piston 134 presses the friction engagement plates 133 as the piston 134 moves toward the drive gear 151.

The third clutch 130 is disengaged when the piston 134 moves to the side away from the drive gear 151 and does not contact the friction engagement plates 133. When the piston 134 moves toward the drive gear 151 and contacts the friction engagement plates 133, an engaging force (torque capacity) is adjusted according to the amount of movement of the piston 134, so that the third clutch 130 is disengaged, slip-engaged, or fully engaged.

The drive unit 140 is used to drive the third clutch 130. The drive unit 140 includes a motor 141 and a screw mechanism 142. The HV ECU 70 controls the motor 141. The screw mechanism 142 is configured as a ball screw and converts rotational motion of the motor 141 to linear motion. The screw mechanism 142 includes a screw shaft member 144, a nut member 145, and a plurality of balls 146 interposed between the screw shaft member 144 and the nut member 145.

The screw shaft member 144 is coupled to the motor 141 via a worm drive 143. The worm drive 143 is a gear pair of a worm 143a and a worm wheel 143b. The worm 143a is formed integrally with a rotary shaft of the motor 141. The worm wheel 143b is placed coaxially with the rear wheel-side transmission shaft 121 and is formed integrally with the screw shaft member 144. Rotation of the motor 141 is reduced in speed and transmitted to the screw shaft member 144 via the worm drive 143.

The nut member 145 is coupled to the screw shaft member 144 such that the nut member 145 is movable in the axial direction of the rear wheel-side transmission shaft 121 with rotation of the screw shaft member 144. The nut member 145 is also coupled to the piston 134 of the third clutch 130 such that the nut member 145 is not movable relative to the piston 134 in the axial direction of the rear wheel-side transmission shaft 121 and is rotatable relative to the piston 134 about the rear wheel-side transmission shaft 121.

The screw mechanism 142 converts rotational motion transmitted from the motor 141 to the screw shaft member 144 to linear motion of the nut member 145 and transmits the linear motion to the friction engagement plates 133 via the piston 134. The engaging force (torque capacity) of the third clutch 130 is thus adjusted.

The transmission mechanism 150 includes the drive gear 151, a driven gear 152, and a chain 153. As described above, the drive gear 151 is coupled to the clutch drum 132 of the third clutch 130. The driven gear 152 is attached to the front wheel-side transmission shaft 122. The chain 153 is wrapped around the drive gear 151 and the driven gear 152. The transmission mechanism 150 transmits a driving force that is transmitted to the drive gear 151 to the driven gear 152 via the chain 153.

In the transfer case 120, the rear wheel-side transmission shaft 121 and the drive gear 151 are disconnected when the third clutch 130 is in the disengaged state. At this time, the transfer case 120 transmits all the driving force that is output to the output shaft 62 of the transmission 60 to the rear wheels 39ra, 39rb. In the transfer case 120, the rear wheel-side transmission shaft 121 and the drive gear 151 are connected when the third clutch 130 is in the slip-engaged state or the fully engaged state. At this time, the transfer case 120 splits the driving force that is output to the output shaft 62 of the transmission 60 between the rear wheels 39ra, 39rb and the front wheels 39fa, 39fb. Specifically, when the third clutch 130 is in the slip-engaged state, the rear wheel-side transmission shaft 121 and the drive gear 151 are allowed to rotate differentially, attaining a differential state. When the third clutch 130 is in the fully engaged state, the rear wheel-side transmission shaft 121 and the drive gear 151 rotate together, attaining a non-differential state (what is called a center differential locked state). The transfer case 120 thus continuously changes the front-to-rear driving force split between, e.g., 0:100 and 50:50 as described above as the engaging force (torque capacity) of the third clutch 130 is controlled by control of the motor 141.

As shown in FIG. 1, the hydraulic brake device 90 includes brake pads 92fa, 92fb, 92ra, 92rb attached to the front wheels 39fa, 39fb and the rear wheels 39ra, 39rb, and a brake actuator 94. The brake actuator 94 is configured as an actuator for adjusting oil pressures of brake wheel cylinders, not shown, that drive the brake pads 92fa, 92fb, 92ra, 92rb and thus applying a braking force to the front wheels 39fa, 39fb and the rear wheels 39ra, 39rb. A brake electronic control unit (brake ECU) 96 controls driving of the brake actuator 94.

Although not shown in the figures, the brake ECU 96 is configured as a microprocessor mainly composed of a CPU. The brake ECU 96 includes, in addition to the CPU, a ROM that stores processing programs, a RAM that temporarily stores data, input and output ports, and a communication port. The brake ECU 96 receives, via the input port, signals from various sensors which are necessary to control driving of the brake actuator 94. Examples of the signals that are input to the brake ECU 96 include wheel speeds Vfa, Vfb, Vra, Vrb of the front wheels 39fa, 39fb and the rear wheels 39ra, 39rb from wheel speed sensors 97fa, 97fb, 97ra, 97rb attached to the front wheels 39fa, 39fb and the rear wheels 39ra, 39rb. The brake ECU 96 outputs a drive control signal etc. for the brake actuator 94 via the output port. The brake ECU 96 is connected to the HV ECU 70 via the communication port.

Although not shown in the figures, the HV ECU 70 is configured as a microprocessor mainly composed of a CPU. The HV ECU 70 includes, in addition to the CPU, a ROM that stores processing programs, a RAM that temporarily stores data, input and output ports, and a communication port. The HV ECU 70 receives signals from various sensors via the input port. Examples of the signals that are input to the HV ECU 70 include: a rotational speed Nth of the input shaft 61 of the transmission 60 from a first rotational speed sensor 61a that detects the rotational speed of the input shaft 61 of the transmission 60; a rotational speed Nout of the output shaft 62 of the transmission 60 from a second rotational speed sensor 62a that detects the rotational speed of the output shaft 62 of the transmission 60; and a rotational position θmt of a rotor of the motor 141 of the transfer case 120 from a third rotational position sensor 141a that detects the rotational position of the rotor of the motor 141 of the transfer case 120. Examples of the signals that are input to the HV ECU 70 further include: an ignition signal from an ignition switch (IG) 80; a shift position SP from a shift position sensor 82 that detects the position of a shift lever 81; an accelerator operation amount Acc from an accelerator pedal position sensor 84 that detects the amount of depression of an accelerator pedal 83; a brake pedal position BP from a brake pedal position sensor 86 that detects the amount of depression of a brake pedal 85; a steering angle θs from a steering angle sensor 87 that detects the steering angle of a steering wheel, not shown; a vehicle body speed V from a vehicle body speed sensor 88; and an outside air temperature To from an outside air temperature sensor 89. The HV ECU 70 outputs a control signal for the transmission 60, a control signal for the transfer case 120, etc. via the output port.

As described above, the HV ECU 70 is connected to the engine ECU 24, the motor ECU 40, the battery ECU 52, and the brake ECU 96 via the communication port. The HV ECU 70 calculates a gear ratio Gr of the transmission 60 by dividing the rotational speed Nth of the input shaft 61 of the transmission 60 from the first rotational speed sensor 61a by the rotational speed Nout of the output shaft 62 of the transmission 60 from the second rotational speed sensor 62a, and estimates a gear stage Gs of the transmission 60 based on the calculated gear ratio Gr. The HV ECU 70 also estimates the amount of movement of the piston 134 of the third clutch 130, the engaging force or torque capacity of the third clutch 130, and a transfer split ratio Rt, based on the rotational position θmt of the rotor of the motor 141 from the third rotational position sensor 141a. As used herein, the transfer split ratio Rt refers to the ratio of the driving force or braking force that is transmitted from the output shaft 62 of the transmission 60 to the rear wheels 39ra, 39rb via the transfer case 120 to the total driving force or total braking force that is transmitted from the output shaft 62 of the transmission 60 to a front differential gear 38f (front wheels 39fa, 39fb) and a rear differential gear 38r (rear wheels 39ra, 39rb) via the transfer case 120. As described above, the transfer case 120 is capable of continuously changing the front-to-rear driving force split between, e.g., 0:100 and 50:50. Accordingly, the transfer split ratio Rt is between, e.g., 0.5 to 1.0.

In the hybrid car 20 of the embodiment configured as described above, the HV ECU 70, the engine ECU 24, and the motor ECU 40 cooperatively control the engine 22, the first and second motors MG1, MG2, the transmission 60, and the transfer case 120 so that the hybrid car 20 travels in hybrid vehicle mode (HV mode) or electric vehicle mode (EV mode). The HV mode is a mode in which the hybrid car 20 travels with the engine 22 being operated, and the EV mode is a mode in the hybrid car 20 travels without operating the engine 22.

The engine 22 and the first and second motors MG1, MG2 are basically controlled as follows. In the HV mode, the HV ECU 70 first sets requested output shaft torque Tout* that is requested for the output shaft (drive shaft) 62 of the transmission 60, based on the accelerator operation amount Acc and the vehicle body speed V. The HV ECU 70 also sets requested input shaft torque Tin* that is requested for the input shaft 61 of the transmission 60, based on the set requested output shaft torque Tout* and the gear ratio Gr of the transmission 60. The HV ECU 70 then sets a target rotational speed Ne* and target torque Te* of the engine 22 and torque commands Tm1*, Tm2* for the first and second motors MG1, MG2 so that the requested input shaft torque Tin* is output to the input shaft 61 of the transmission 60 within the input and output limits Win, Wout of the battery 50 with operation of the engine 22. The HV ECU 70 sends the target rotational speed Ne* and the target torque Te* of the engine 22 to the engine ECU 24 and sends the torque commands Tm1*, Tm2* for the first and second motors MG1, MG2 to the motor ECU 40. The engine ECU 24 performs intake air amount control, fuel injection control, ignition control, etc. of the engine 22 so that the engine 22 operates based on the target rotational speed Ne* and the target torque Te*. The motor ECU 40 controls driving of the first and second motors MG1, MG2 (specifically, controls switching of the switching elements of the first and second inverters 41, 42) so that the first and second motors MG1, MG2 are driven according to the torque commands Tm1*, Tm2*.

In the EV mode, the HV ECU 70 first sets requested input shaft torque Tin* as in the HV mode. The HV ECU 70 then sets a torque command Tm1* for the first motor MG1 to a value of 0, and also sets a torque command Tm2* for the second motor MG2 so that the requested input shaft torque Tin* is output to the input shaft 61 of the transmission 60 within the input and output limits Win, Wout of the battery 50. The HV ECU 70 sends the torque commands Tm1*, Tm2* for the first and second motors MG1, MG2 to the motor ECU 40. The motor ECU 40 controls driving of the first and second motors MG1, MG2 in the manner described above.

The transmission 60 is basically controlled as follows. The HV ECU 70 sets requested output shaft torque Tout* that is requested for the output shaft (drive shaft) 62 of the transmission 60, based on the accelerator operation amount Acc and the vehicle body speed V. The HV ECU 70 also sets a target gear stage Gs* of the transmission 60 based on the requested output shaft torque Tout* and the vehicle body speed V. The HV ECU 70 then controls the transmission 60 so as to achieve the target gear stage Gs* of the transmission 60.

The transfer case 120 is basically controlled as follows. The HV ECU 70 sets a target transfer split ratio Rt* based on the accelerator operation amount Acc, the vehicle body speed V, the steering angle θs, etc., and controls the transfer case 120 so as to achieve the target transfer split ratio Rt*.

In the hybrid car 20 of the embodiment, a braking force is basically applied to the vehicle in the following manner when the driver depresses the brake pedal 85. The HV ECU 70 first sets, based on the brake pedal position BP, a requested braking force Fb* (negative value) that is requested for the vehicle, and obtains requested braking torque Tb* (negative value) by converting the requested braking force Fb* to torque of a rotary shaft of the second motor MG2. The HV ECU 70 then calculates minimum allowable torque Tm2min of the second motor MG2 by dividing the input limit Win (negative value) of the battery 50 by the rotational speed Nm2 of the second motor MG2. The HV ECU 70 sets a torque command Tm2* for the second motor MG2 by limiting (guarding) the requested braking torque Tb* by the minimum allowable torque Tm2min. The HV ECU 70 subtracts the torque command Tm2* for the second motor MG2 from the requested braking torque Tb* and sets a brake torque command Th* for the hydraulic brake device 90 to the resultant value (value of 0 or negative value). The HV ECU 70 then sends the torque command Tm2* for the second motor MG2 to the motor ECU 40 and sends the brake torque command Th* for the hydraulic brake device 90 to the brake ECU 96. The motor ECU 40 controls driving of the second motor MG2 in the manner described above. The brake ECU 96 sets a target hydraulic braking force Fh* by converting the brake torque command Th* for the hydraulic brake device 90 to a braking force for braking the vehicle, on the condition that the brake torque command Th* is a negative value. The brake ECU 96 controls driving of the brake actuator 94 using the set target hydraulic braking force Fh* and a target oil pressure split ratio Rh*. The target oil pressure split ratio Rh* is a target value of an oil pressure split ratio Rh. As used herein, the oil pressure split ratio Rh refers to the ratio of the braking force that is applied to the rear wheels 39ra, 39rb by the hydraulic brake device 90 to the total braking force that is applied to the front wheels 39fa, 39fb and the rear wheels 39ra, 39rb by the hydraulic brake device 90. How to set the target oil pressure split ratio Rh* will be described later. With this control, when the requested braking torque Tb* is within the minimum allowable torque Tm2min, the vehicle is braked by the second motor MG2 without using the hydraulic brake device 90. When the requested braking torque Tb* is a value which is not within the minimum allowable torque Tm2min, the vehicle is braked by the second motor MG2 and the hydraulic brake device 90. The target oil pressure split ratio Rh* is an example of the "target braking split ratio" of the disclosure.

When a replacement condition, such as a condition that the vehicle body speed V becomes equal to or lower than a threshold Vsp that is a vehicle body speed immediately before the vehicle stops, is satisfied while the vehicle is being braked by the second motor MG2 or while the vehicle is being braked by the second motor MG2 and the hydraulic brake device 90, the brake ECU 96 gradually makes the torque command Tm2* for the second motor MG2 closer to a value of 0 and also gradually makes the brake torque command Th* for the hydraulic brake device 90 closer to the requested braking torque Tb*, and sends the torque command Tm2* and the brake torque command Th* to the motor ECU 40 and the brake ECU 96. A replacement process of replacing the vehicle braking force by the second motor MG2 with the vehicle braking force by the hydraulic brake device 90 is thus performed.

Figure 6:
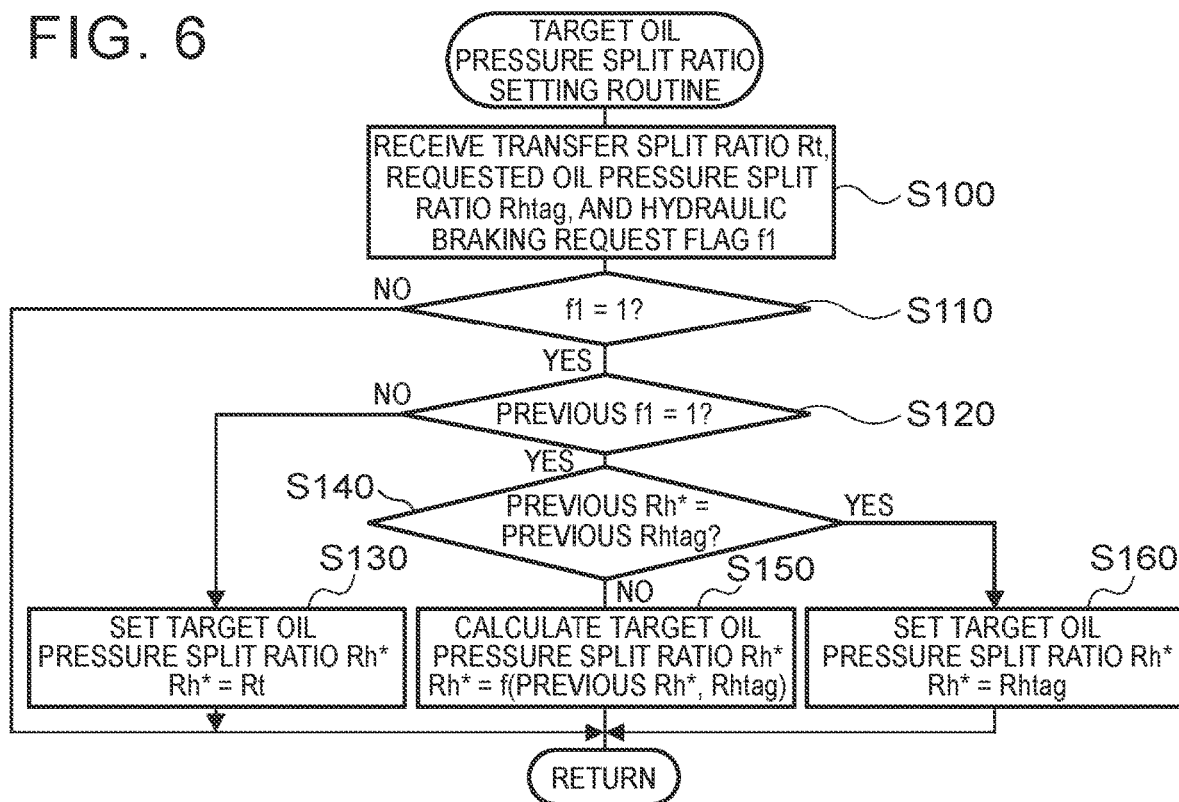
FIG. 6 is a flowchart illustrating an example of a target oil pressure split ratio setting routine that is executed by a brake ECU shown in FIG. 1.

Next, operation of the hybrid car 20 of the embodiment configured as described above will be described, especially focusing on how the hybrid car 20 of the embodiment is operated during setting of the target oil pressure split ratio Rh*. FIG. 6 is a flowchart illustrating an example of a target oil pressure split ratio setting routine that is executed by the brake ECU 96. The brake ECU 96 repeatedly executes this routine while the driver is depressing the brake pedal 85.

In the target oil pressure split ratio setting routine of FIG. 6, the brake ECU 96 first receives a transfer split ratio Rt, a requested oil pressure split ratio Rhtag, a hydraulic braking request flag f1, etc. (step S100). This transfer split ratio Rt is a value estimated by the HV ECU 70, and the brake ECU 96 receives this value from the HV ECU 70 by communication. The requested oil pressure split ratio Rhtag is a requested value of the oil pressure split ratio Rh. This requested oil pressure split ratio Rhtag is a value set by the brake ECU 96 based on the brake pedal position BP, the vehicle body speed V, the steering angle θs, etc.

The hydraulic braking request flag f1 has a value set by the brake ECU 96. When the brake ECU 96 receives a brake torque command Th* having a negative value from the HV ECU 70, the brake ECU 96 determines that braking of the vehicle by the hydraulic brake device 90 is being requested, and sets the hydraulic braking request flag f1 to a value of 1. When the brake ECU 96 receives a brake torque command Th* having a value of 0 from the HV ECU 70, the brake ECU 96 determines that braking of the vehicle by the hydraulic brake device 90 is not being requested, and sets the hydraulic braking request flag f1 to a value of 0.

Once the brake ECU 96 thus receives the data, the brake ECU 96 checks the value of the hydraulic braking request flag f1 (step S110). When the hydraulic braking request flag f1 has a value of 0, the brake ECU 96 determines that braking of the vehicle by the hydraulic brake device 90 is not being requested, and ends this routine.

When the hydraulic braking request flag f1 has a value of 1 in step S110, the brake ECU 96 determines that braking of the vehicle by the hydraulic brake device 90 is being requested, and checks the previous hydraulic braking request flag (previous F1) (step S120). Since the brake ECU 96 performs step 5120 when the hydraulic braking request flag f1 has a value of 1, step S120 is a process of determining whether the request for braking of the vehicle by the hydraulic brake device 90 has just been made. For example, a request for braking of the vehicle by the hydraulic brake device 90 is made, when the replacement condition is satisfied or the requested braking torque Tb* becomes a value which is not within the minimum allowable torque Tm2min, while the vehicle is being braked by the second motor MG2 without using the hydraulic brake device 90.

When the previous hydraulic braking request flag (previous f1) has a value of 0 in step S120, the brake ECU 96 determines that the request for braking of the vehicle by the hydraulic brake device 90 has just been made. The brake ECU 96 then sets a target oil pressure split ratio Rh* to the transfer split ratio Rt (step S130) and ends this routine.

Once the brake ECU 96 thus sets the target oil pressure split ratio Rh*, the brake ECU 96 controls driving of the brake actuator 94 using a target hydraulic braking force Fh* and the target oil pressure split ratio Rh*, as described above. This allows the split of the braking force between the front wheels 39fa, 39fb and the rear wheels 39ra, 39rb to be the same before and after braking of the vehicle by the hydraulic brake device 90 is started. As a result, the vehicle attitude is further restrained from changing before and after braking of the vehicle by the hydraulic brake device 90 is started, and deterioration in drivability is further reduced.

When the previous hydraulic braking request flag (previous f1) has a value of 1 in step S120, the brake ECU 96 determines that the request for braking of the vehicle by the hydraulic brake device 90 has been continued, and determines whether the previous target oil pressure split ratio (previous Rh*) is equal to the previous requested oil pressure split ratio (previous Rhtag) (step S140).

When the previous target oil pressure split ratio (previous Rh*) is different from the previous requested oil pressure split ratio (previous Rhtag) in step S140, the brake ECU 96 calculates a target oil pressure split ratio Rh* by gradually changing (rating or smoothing) the target oil pressure split ratio Rh* toward the requested oil pressure split ratio Rhtag (step S150), and ends this routine. For example, the target oil pressure split ratio Rh* is calculated by the following expression (1) using the requested oil pressure split ratio Rhtag, the previous target oil pressure split ratio (previous Rh*), and a rate value ARh or is calculated by the following expression (2) using the requested oil pressure split ratio Rhtag, the previous target oil pressure split ratio (previous Rh*), and a time constant τ.

$$Rh^* = \max(\min(Rh\text{tag}, \text{previous } Rh^* + \Delta Rh), \text{previous } Rh^* - \Delta Rh) \quad (1)$$

$$Rh^* = Rh\text{tag} \cdot (-\tau) + \text{previous } Rh^* \cdot \tau \quad (2)$$

As the brake ECU 96 repeats steps S100 to 120, S140, and S150, the target oil pressure split ratio Rh* gradually changes from the transfer split ratio Rt toward the requested oil pressure split ratio Rhtag. Since the target oil pressure split ratio Rh* thus changes gradually, a change in vehicle attitude is restrained as compared to the case where the target oil pressure split ratio Rh* changes rapidly.

When the previous target oil pressure split ratio (previous Rh*) is equal to the previous requested oil pressure split ratio (previous Rhtag) in step S140, the brake ECU 96 sets the target oil pressure split ratio Rh* to the requested oil pressure split ratio Rhtag (step S160) and ends this routine. Accordingly, when the target oil pressure split ratio Rh* is set to the requested oil pressure split ratio Rhtag in step S150, the target oil pressure split ratio Rh* will be set to the requested oil pressure split ratio Rhtag when the hydraulic braking request flag f1 has a value of 1 during the subsequent execution of this routine.

Figure 7:
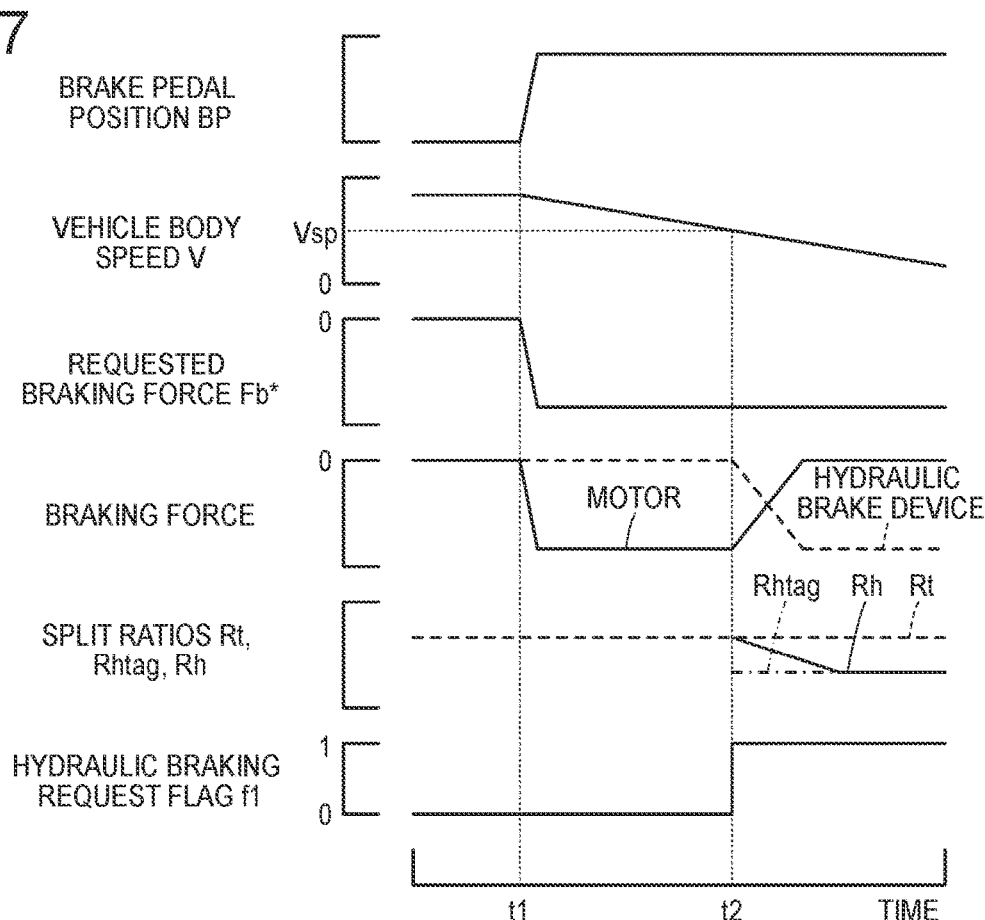
FIG. 7 illustrates an example of a brake pedal position, a vehicle body speed, a requested braking force, a braking force by the second motor or a hydraulic brake device, a transfer split ratio, a requested oil pressure split ratio, an oil pressure split ratio, and a hydraulic braking request flag of the hybrid car.

FIG. 7 illustrates an example of the brake pedal position BP, the vehicle body speed V, the requested braking force Fb*, the braking force by the second motor MG2 or the hydraulic brake device 90, the transfer split ratio Rt, the requested oil pressure split ratio Rhtag, the oil pressure split ratio Rh, and the hydraulic braking request flag f1. As shown in the figure, the brake pedal 85 is depressed at time t1. In response to this, the requested braking force Fb* based on the brake pedal position BP is set, and the braking force according to the requested braking force Fb* is applied from the second motor MG2 to the front wheels 39fa, 39fb and the rear wheels 39ra, 39rb via the transfer case 120 at the transfer split ratio Rt. The vehicle body speed V becomes equal to or lower than the threshold Vsp at time t2. Namely, the replacement condition is satisfied at time t2. In response to this, the hydraulic braking request flag f1 is set to a value of 1, and the vehicle braking force by the second motor MG2 is replaced with the vehicle braking force by the hydraulic brake device 90. At this time, an initial value of the oil pressure split ratio Rh is set to the transfer split ratio Rt. This allows the split of the braking force between the front wheels 39fa, 39fb and the rear wheels 39ra, 39rb to be the same before and after braking of the vehicle by the hydraulic brake device 90 is started. As a result, the vehicle attitude is restrained from changing before and after braking of the vehicle by the hydraulic brake device 90 is started. Subsequently, the oil pressure split ratio Rh gradually becomes closer to the requested oil pressure split ratio Rhtag. The vehicle attitude is thus restrained from changing when the oil pressure split ratio Rh changes from the transfer split ratio Rt toward the requested oil pressure split ratio Rhtag.

In the hybrid car 20 of the embodiment described above, the brake ECU 96 controls the hydraulic brake device 90 using the target oil pressure split ratio Rh* when braking of the vehicle by the hydraulic brake device 90 is performed. At this time, the brake ECU 96 sets an initial value of the target oil pressure split ratio Rh* to the transfer split ratio Rt when braking of the vehicle by the hydraulic brake device 90 is started while the vehicle is being braked by the second motor MG2. This allows the split of the braking force between the front wheels 39fa, 39fb and the rear wheels 39ra, 39rb to be the same before and after braking of the vehicle by the hydraulic brake device 90 is started. As a result, the vehicle attitude is restrained from changing before and after braking of the vehicle by the hydraulic brake device 90 is started.

In the hybrid car 20 of the embodiment, the brake ECU 96 sets the initial value of the target oil pressure split ratio Rh* to the transfer split ratio Rt when braking of the vehicle by the hydraulic brake device 90 is started while the vehicle is being braked by the second motor MG2. However, the initial value of the target oil pressure split ratio Rh* may be set to a value within an allowable range about the transfer split ratio Rt. In this case, the initial value of the target oil pressure split ratio Rh* is set by, e.g., the following expression (3) using the requested oil pressure split ratio Rhtag, the transfer split ratio Rt, and an allowable value ARt. The allowable value ARt may always be the same, or the lower the transfer split ratio Rt is, the smaller the allowable value ARt may be.

$$Rh^* = \max(\min(Rh\text{tag}, Rt+\Delta Rh), Rt-\Delta Rh) \quad (3)$$

Figure 8:
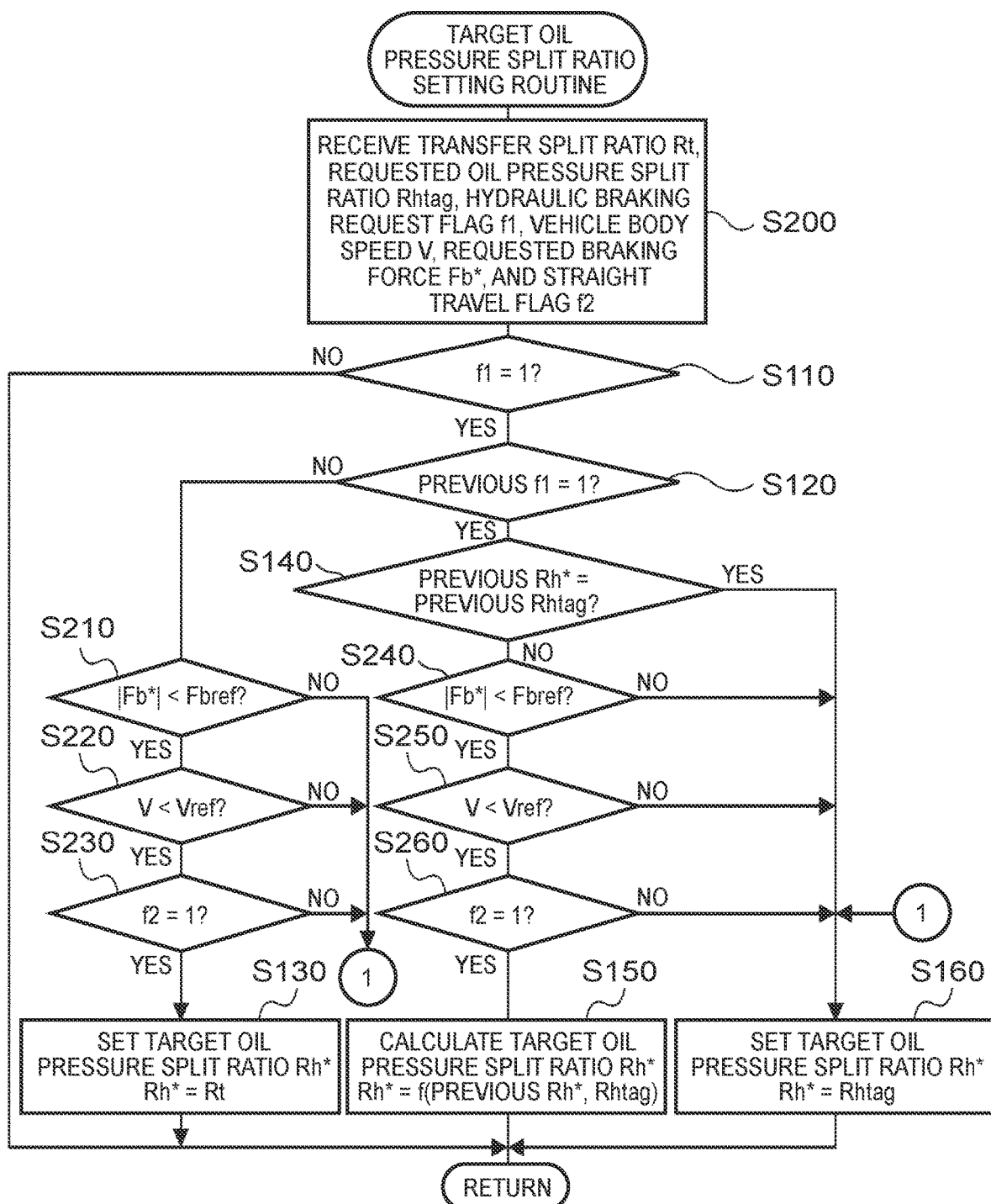
FIG. 8 is a flowchart illustrating a modification of the target oil pressure split ratio setting routine that is executed by the brake ECU shown in FIG. 1.

In the hybrid car 20 of the embodiment, the brake ECU 96 executes the target oil pressure split ratio setting routine of FIG. 6. Alternatively, the brake ECU 96 may execute a target oil pressure split ratio setting routine of FIG. 8. The target oil pressure split ratio setting routine of FIG. 8 is the same as that of FIG. 6 except that step S100 is replaced with step S200 and steps S210 to S260 are added. In the target oil pressure split ratio setting routine of FIG. 8, the same steps as those of the target oil pressure split ratio setting routine of FIG. 6 are denoted by the same step numbers, and detailed description thereof will be omitted.

In the target oil pressure split ratio setting routine of FIG. 8, the brake ECU 96 first receives data such as a vehicle body speed V, a requested braking force Fb*, and a straight travel flag f2, in addition to a transfer split ratio Rt, a requested oil pressure split ratio Rhtag, and a hydraulic braking request flag f1 as in step S100 (step S200). The vehicle body speed V is a value detected by the vehicle body speed sensor 88. The requested braking force Fb* is a value set by the HV ECU 70, and the brake ECU 96 receives this value from the HV ECU 70 by communication. The straight travel flag f2 has a value set by the HV ECU 70 based on the steering angle θs from the steering angle sensor 87, and the brake ECU 96 receives the straight travel flag f2 from the HV ECU 70 by communication. When the absolute value of the steering angle θs is equal to or smaller than a threshold θsref, the HV ECU 70 determines that the vehicle is traveling straight, and sets the straight travel flag f2 to a value of 1. When the absolute value of the steering angle θs is larger than the threshold θsref, the HV ECU 70 determines that the vehicle is making a turn traveling, and sets the straight travel flag f2 to a value of 0.

When the previous hydraulic braking request flag (previous F1) has a value of 0 in step S120, the brake ECU 96 compares the absolute value of the requested braking force Fb* with a threshold Fbref (step S210), compares the vehicle body speed V with a threshold Vref (step S220), and checks the value of the straight travel flag f2 (step S230). The threshold Fbref is a threshold that is used to determine whether sudden braking of the vehicle has been requested, and is sufficiently larger than the absolute value of the minimum allowable torque Tm2min of the second motor MG2. The threshold Vref is a threshold that is used to determine whether the vehicle is traveling at relatively high speeds, and is sufficiently larger than the threshold Vsp described above.

When the absolute value of the requested braking force Fb* is smaller than the threshold Fbref in step S210, the vehicle body speed V is lower than the threshold Vref in step S220, and the straight travel flag f2 has a value of 1 in step S230, the brake ECU 96 sets a target oil pressure split ratio Rh* to the transfer split ratio Rt (step S130) and ends this routine.

When the absolute value of the requested braking force Fb* is equal to or larger than the threshold Fbref in step S210, the vehicle body speed V is equal to or higher than the threshold Vref in step S220, or the straight travel flag f2 has a value of 0 in step S230, the brake ECU 96 determines that sudden braking of the vehicle has been requested, that the vehicle is traveling at relatively high speeds, or that the vehicle is making a turn traveling, and sets the target oil pressure split ratio Rh* to the requested oil pressure split ratio Rhtag (step S160). The brake ECU 96 then ends this routine.

As described above, the brake ECU 96 sets the target oil pressure split ratio Rh* to the requested oil pressure split ratio Rhtag when sudden braking of the vehicle is requested, the vehicle is traveling at relatively high speeds, or the vehicle is making a turn traveling immediately after a request for braking of the vehicle by the hydraulic brake device 90 is made. In these cases, the target oil pressure split ratio Rh* is, e.g., 0.5. In the case where sudden braking of the vehicle is requested, the vehicle is traveling at relatively high speeds, or the vehicle is making a turn traveling, setting the target oil pressure split ratio Rh* to the requested oil pressure split ratio Rhtag is considered to be more advantageous for stability of the vehicle behavior than setting the target oil pressure split ratio Rh* to the transfer split ratio Rt. In view of this, the brake ECU 96 performs such control in this modification.

When the previous hydraulic braking request flag (previous F1) has a value of 1 in step S120 and the previous target oil pressure split ratio (previous Rh*) is different from the previous requested oil pressure split ratio (previous Rhtag) in step S140, the brake ECU 96 compares the absolute value of the requested braking force Fb* with the threshold Fbref (step S240), compares the vehicle body speed V with the threshold Vref (step S250), and checks the value of the straight travel flag f2 (step S260). Steps S240 to S260 are the same as steps S210 to S230 described above.

When the absolute value of the requested braking force Fb* is smaller than the threshold Fbref in step S240, the vehicle body speed V is lower than the threshold Vref in step S250, and the straight travel flag f2 has a value of 1 in step S260, the brake ECU 96 calculates a target oil pressure split ratio Rh* by gradually changing the target oil pressure split ratio Rh* toward the requested oil pressure split ratio Rhtag (step S150), and ends this routine.

When the absolute value of the requested braking force Fb* is equal to or larger than the threshold Fbref in step S240, the vehicle body speed V is equal to or higher than the threshold Vref in step S250, or the straight travel flag f2 has a value of 0 in step S260, the brake ECU 96 sets the target oil pressure split ratio Rh* to the requested oil pressure split ratio Rhtag (step S160) and ends this routine. The oil pressure split ratio Rh can thus be quickly made equal to the requested oil pressure split ratio Rthag.

The target oil pressure split ratio setting routine of FIG. 8 has steps S210 to S260 in addition to the steps of the target oil pressure split ratio setting routine of FIG. 6. However, the target oil pressure split ratio setting routine of FIG. 8 may have a part of steps S210, S240, steps S220, S250, and steps S230, S260 in addition to the steps of the target oil pressure split ratio setting routine of FIG. 6. That is, the brake ECU 96 may set the target oil pressure split ratio Rh* in view of only one or two of the absolute value of the requested braking force Fb*, the vehicle body speed V, and the straight travel flag f2.

The target oil pressure split ratio setting routine of FIG. 8 has steps S210 to S260 in addition to the steps of the target oil pressure split ratio setting routine of FIG. 6. However, the target oil pressure split ratio setting routine of FIG. 8 may have at least a part of steps S210 to S230 in addition to the steps of the target oil pressure split ratio setting routine of FIG. 6 and may not have steps S240 to S260. That is, the brake ECU 96 may set the target oil pressure split ratio Rh* in view of at least one of the absolute value of the requested braking force Fb*, the vehicle body speed V, and the straight travel flag f2 only when the previous hydraulic braking request flag (previous F1) has a value of 0 in step S120.

Figure 9:
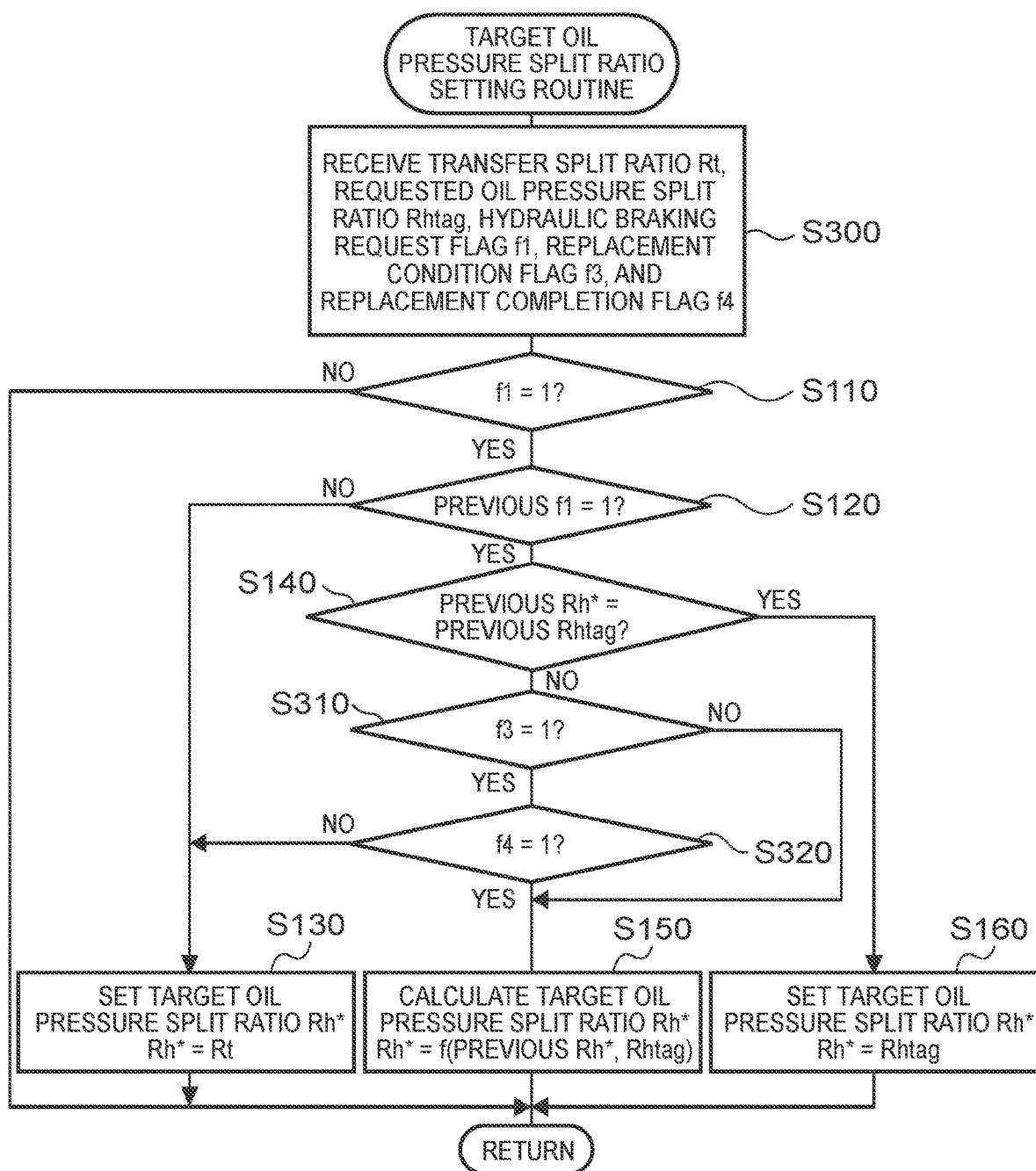
FIG. 9 is a flowchart illustrating another modification of the target oil pressure split ratio setting routine that is executed by the brake ECU shown in FIG. 1.

In the hybrid car 20 of the embodiment, the brake ECU 96 executes the target oil pressure split ratio setting routine of FIG. 6. Alternatively, the brake ECU 96 may execute a target oil pressure split ratio setting routine of FIG. 9. The target oil pressure split ratio setting routine of FIG. 9 is the same as that of FIG. 6 except that step S100 is replaced with step S300 and steps S310 and S320 are added. In the target oil pressure split ratio setting routine of FIG. 9, the same steps as those of the target oil pressure split ratio setting routine of FIG. 6 are denoted by the same step numbers, and detailed description thereof will be omitted.

In the target oil pressure split ratio setting routine of FIG. 9, the brake ECU 96 first receives data such as a replacement condition flag f3 and a replacement completion flag f4, in addition to a transfer split ratio Rt, a requested oil pressure split ratio Rhtag, and a hydraulic braking request flag f1 as in step S100 (step S300). Each of the replacement condition flag f3 and the replacement completion flag f4 has a value set by the HV ECU 70. When the replacement condition is not satisfied, the HV ECU 70 sets the replacement condition flag f3 to a value of 0. When the replacement condition is satisfied, the HV ECU 70 switches the replacement condition flag f3 to a value of 1. When the replacement process is not completed, the HV ECU 70 sets the replacement completion flag f4 to a value of 0. When the replacement process is completed, the I-TV ECU 70 switches the replacement completion flag f4 to a value of 1.

When the previous target oil pressure split ratio (previous Rh*) is different from the previous requested oil pressure split ratio (previous Rhtag) in step S140, the brake ECU 96 checks the value of the replacement condition flag f3 and the value of the replacement completion flag f4 (steps S310, S320). When the replacement condition flag f3 has a value of 1 and the replacement completion flag f4 has a value of 0, the brake ECU 96 determines that the replacement condition is satisfied but the replacement process is not completed, and sets a target oil pressure split ratio Rh* to the transfer split ratio Rt (step S130). The brake ECU 96 then ends this routine. When both the replacement condition flag f3 and the replacement completion flag f4 have a value of 1, the brake ECU 96 determines that the replacement process is completed, and calculates the target oil pressure split ratio Rh* by gradually changing the target oil pressure split ratio Rh* toward the requested oil pressure split ratio Rhtag (step S150). The brake ECU 96 then ends this routine.

As described above, the brake ECU 96 thus sets the target oil pressure split ratio Rh* to the transfer split ratio Rt during the replacement process. This restrains the split of the braking force between the front wheels 39fa, 39fb and the rear wheels 39ra, 39rb from changing during the replacement process. The split of the braking force between the front wheels 39fa, 39fb and the rear wheels 39ra, 39rb can be made constant especially when the transfer split ratio Rt is constant.

When the replacement condition flag f3 has a value of 0 in step S310, the brake ECU 96 determines that the hydraulic braking flag f1 has a value of 1 due to a condition other than the replacement condition (the condition that the requested braking torque Tb* becomes a value which is not within the minimum allowable torque Tm2min).

In this case, the brake ECU 96 does not set the target oil pressure split ratio Rh* to the transfer split ratio Rt but calculates the target oil pressure split ratio Rh* by gradually changing the target oil pressure split ratio Rh* toward the requested oil pressure split ratio Rhtag (step S150), and ends this routine.

The target oil pressure split ratio setting routine of FIG. 9 may additionally have at least a part of steps S210 to S260 of the target oil pressure split ratio setting routine of FIG. 8. In this case, for example, the target oil pressure split ratio setting routine of FIG. 9 may have at least a part of steps S210, S240, steps S220, S250, and steps S230, S260 after step S120 or step S140. Alternatively, the target oil pressure split ratio setting routine of FIG. 9 may have at least a part of steps S210 to S230 after step S120 and may not have steps S240 to S260.

In the hybrid car 20 of the embodiment, the second motor MG2 is directly connected to the input shaft 61 of the transmission 60. However, the second motor MG2 may be connected to the input shaft 61 of the transmission 60 via a speed reducer. The second motor MG2 may be directly connected to the output shaft 62 of the transmission 60. The second motor MG2 may be connected to the output shaft 62 of the transmission 60 via a speed reducer.

In the hybrid car 20 of the embodiment, the drive unit 140 of the transfer case 120 includes the motor 141 and the screw mechanism 142 that converts rotational motion of the motor 141 to linear motion to drive the piston 134 of the third clutch 130 (to move the piston 134 in the axial direction of the piston 134). However, the drive unit 140 may include a cam mechanism that converts rotational motion of the motor 141 to linear motion, instead of the screw mechanism 142. The drive unit 140 may include a hydraulic controller that hydraulically drives the piston 134, instead of the motor 141 and the screw mechanism 142.

In the hybrid car 20 of the embodiment, the transfer case 120 is capable of continuously changing the front-to-rear driving force split between, e.g., 0:100 and 50:50. However, the transfer case 120 may be capable of switching the front-to-rear driving force split between two stages, namely between, e.g., 0:100 and 50:50.

In the hybrid car 20 of the embodiment, a four-gear transmission is used as the transmission 60. However, a three-gear transmission, a five-gear transmission, a six-gear transmission, etc. may be used as the transmission 60.

Figure 10:
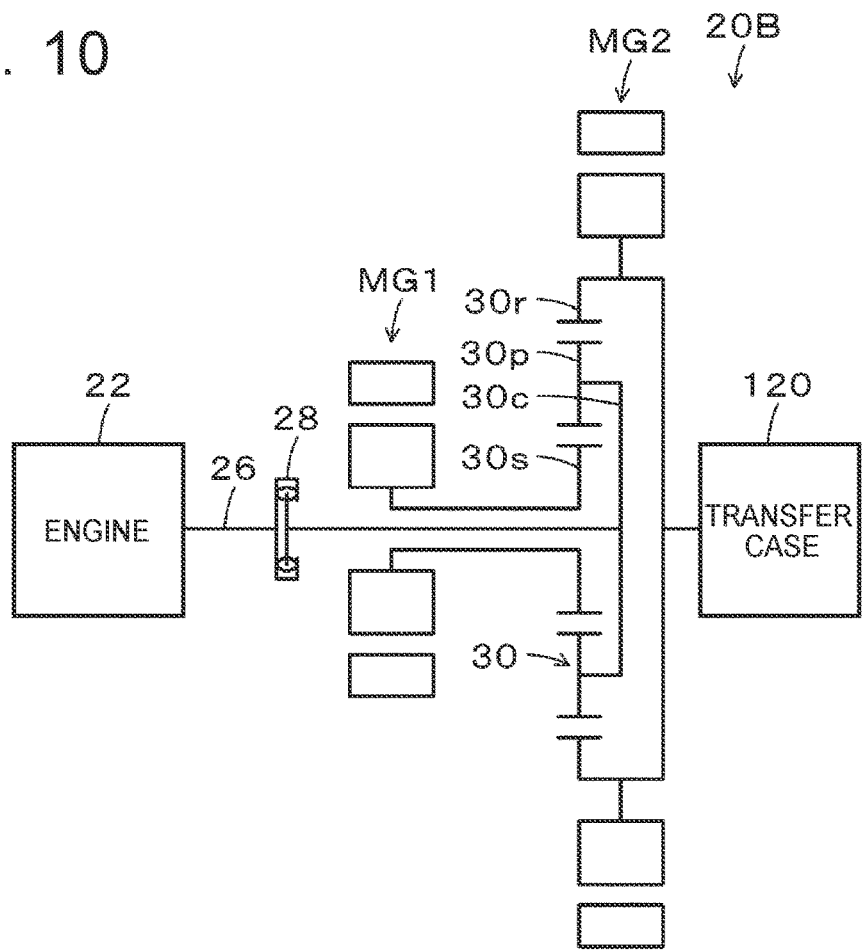
FIG. 10 is a configuration diagram illustrating the general configuration of a hybrid car according to a first modification.

The hybrid car 20 of the embodiment includes the transmission 60. Namely, the ring gear 30r of the planetary gear 30 and the second motor MG2 are coupled to the rear wheel-side transmission shaft 121 of the transfer case 120 via the transmission 60. However, like a hybrid car 20B of a first modification show in FIG. 10, the vehicle may not include the transmission 60. In the hybrid car 20B of FIG. 10, the planetary gear 30 and the second motor MG2 are directly coupled to the transfer case 120.

In the hybrid car 20 of the embodiment, the battery 50 is used as a power storage device. However, a capacitor may be used as the power storage device.

The hybrid car 20 of the embodiment includes the engine ECU 24, the motor ECU 40, the battery ECU 52, the brake ECU 96, and the HV ECU 70. However, at least two of these ECUs may be configured as a single electronic control unit.

Figure 11:
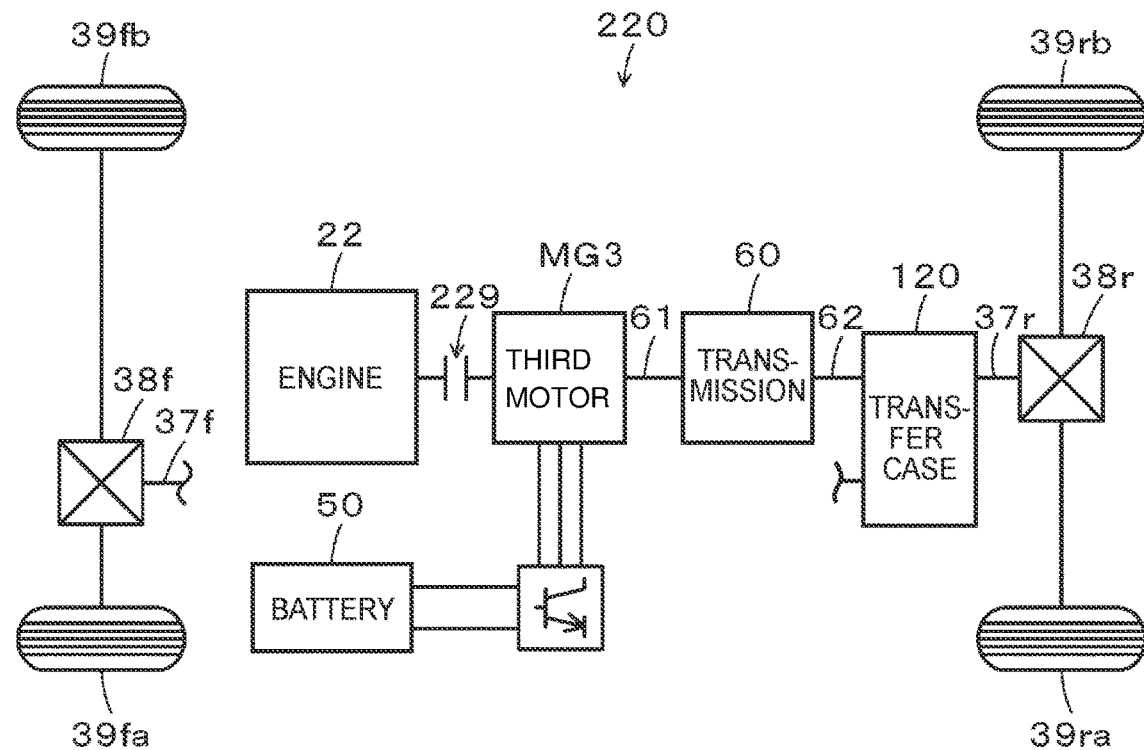
FIG. 11 is a configuration diagram illustrating the general configuration of a hybrid car according to a second modification.
Figure 12:
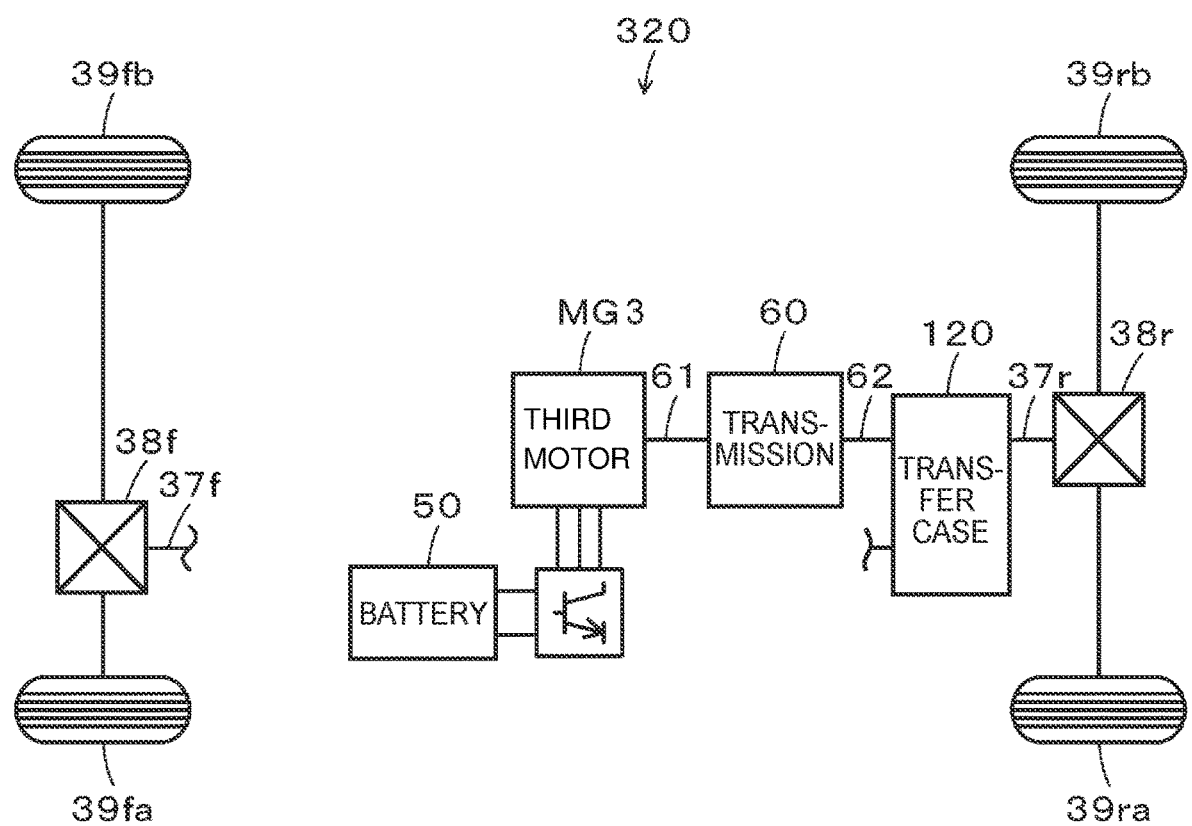
FIG. 12 is a configuration diagram illustrating the general configuration of an electric car according to a third modification as an example of the electric vehicle.

In the hybrid car 20 of the embodiment, the output shaft 62 of the transmission 60 is connected to the transfer case 120, the ring gear 30r of the planetary gear 30 and the second motor MG2 are connected to the input shaft 61 of the transmission 60, and the first motor MG1 and the engine 22 are connected to the sun gear 30s and the carrier 30c of the planetary gear 30, respectively. However, as shown in a hybrid car 220 of a second modification of FIG. 11, the output shaft 62 of the transmission 60 may be connected to the transfer case 120, a third motor MG3 may be connected to the input shaft 61 of the transmission 60, and the engine 22 may be connected to the third motor MG3 via a fourth clutch 229. As shown in an electric car 320 of a third modification of FIG. 12, the vehicle may not include the engine, the output shaft 62 of the transmission 60 may be connected to the transfer case 120, and the third motor MG3 may be connected to the input shaft 61 of the transmission 60. The electric car 320 may not include the transmission 60, and the third motor MG3 may be directly connected to the transfer case 120.

The hybrid car 20 of the embodiment, the hybrid car 220 of the second modification, and the electric car 320 of the third modification are configured as a part-time four-wheel drive (4WD) car. However, the hybrid car 20, the hybrid car 220, and the electric car 320 may be configured as a full-time 4WD car.

The hybrid car 20 of the embodiment, the hybrid car 220 of the second modification, and the electric car 320 of the third modification are configured as a rear-wheel drive based 4WD vehicle in which the rear wheels 39ra, 39rb are main drive wheels and the front wheels 39fa, 39fb are sub drive wheels. However, the hybrid car 20, the hybrid car 220, and the electric car 320 may be configured as a front-wheel drive based 4WD vehicle in which the front wheels 39fa, 39fb are main drive wheels and the rear wheels 39ra, 39rb are sub drive wheels.

Correspondence between the main elements of the embodiment and the main elements of the disclosure described in "SUMMARY" will be described. In the embodiment, the second motor MG2 and the third motor MG3 are examples of the "motor" of the disclosure. The transfer case 120 is an example of the "driving force split device" of the disclosure. The hydraulic brake device 90 is an example of the "braking force applying device" of the disclosure. The motor ECU 40 and the brake ECU 96 are examples of the "controller." The transfer split ratio Rt is an example of the "transmission split ratio" of the disclosure.

The correspondence between the main elements of the embodiment and the main elements of the disclosure described in "SUMMARY" is shown merely by way of example in order to specifically describe the mode in which the embodiment carries out the disclosure described in "SUMMARY" Therefore, the correspondence is not intended to limit the elements of the disclosure described in "SUMMARY" That is, the disclosure described in "SUMMARY" should be interpreted based on the description in "SUMMARY" and the embodiment is merely a specific example of the disclosure described in "SUMMARY."

Although the mode for carrying out the disclosure is described above based on the embodiment, the disclosure is not limited in any way to the embodiment and can be carried out in various forms without departing from the spirit and scope of the disclosure.

The disclosure is applicable to the manufacturing industry of electric vehicles etc.

What is claimed is:

1. An electric vehicle comprising:
a motor connected to a drive shaft;
a driving force split device configured to transmit a driving force from the drive shaft to a front wheel and a rear wheel and to adjust a transmission split ratio, the transmission split ratio being a ratio of the driving force that is transmitted from the drive shaft to the rear wheel via the driving force split device to a total driving force that is transmitted from the drive shaft to the front wheel and the rear wheel via the driving force split device;

a braking force applying device configured to apply a braking force to the front wheel and the rear wheel; and a controller configured to control the braking force applying device based on a target braking split ratio when braking of the electric vehicle by the braking force applying device is performed, the target braking split ratio being a target value of a ratio of the braking force that is applied to the rear wheel by the braking force applying device to a total braking force that is applied to the front wheel and the rear wheel by the braking force applying device, wherein the controller is configured to set an initial value of the target braking split ratio to a value within an allowable range about the transmission split ratio when braking of the electric vehicle by the braking force applying device is started while the electric vehicle is being braked by the motor.

2. The electric vehicle according to claim 1, wherein the controller is configured to set the initial value of the target braking split ratio to the transmission split ratio when braking of the electric vehicle by the braking force applying device is started while the electric vehicle is being braked by the motor.

3. The electric vehicle according to claim 1, wherein the controller is configured to gradually change the target braking split ratio toward a requested split ratio that is requested for the braking force applying device, after braking of the electric vehicle by the braking force applying device is started while the electric vehicle is being braked by the motor.

4. The electric vehicle according to claim 3, wherein the controller is configured to set the target braking split ratio to the transmission split ratio until a replacement process is completed after braking of the electric vehicle by the braking force applying device is started while the electric vehicle is being braked by the motor, the replacement process being a process of replacing a vehicle braking force by the motor with a vehicle braking force by the braking force applying device.

5. The electric vehicle according to claim 1, wherein the controller is configured to set the initial value of the target braking split ratio to a requested split ratio that is requested for the braking force applying device, in a case where an absolute value of a requested braking force that is requested for the electric vehicle is equal to or larger than a predetermined braking force when braking of the electric vehicle by the braking force applying device is started while the electric vehicle is being braked by the motor.

6. The electric vehicle according to claim 1, wherein the controller is configured to set the initial value of the target braking split ratio to a requested split ratio that is requested for the braking force applying device, in a case where a vehicle body speed is equal to or higher than a predetermined vehicle body speed when braking of the electric vehicle by the braking force applying device is started while the electric vehicle is being braked by the motor.

7. The electric vehicle according to claim 1, wherein the controller is configured to set the initial value of the target braking split ratio to a requested split ratio that is requested for the braking force applying device, in a case where the electric vehicle is making a turn traveling when braking of the electric vehicle by the braking force applying device is started while the electric vehicle is being braked by the motor.

8. A method for controlling an electric vehicle, the electric vehicle including a motor connected to a drive shaft, a driving force split device configured to transmit a driving force from the drive shaft to a front wheel and a rear wheel and to adjust a transmission split ratio, the transmission split ratio being a ratio of the driving force that is transmitted from the drive shaft to the rear wheel via the driving force split device to a total driving force that is transmitted from the drive shaft to the front wheel and the rear wheel via the driving force split device, and a braking force applying device configured to apply a braking force to the front wheel and the rear wheel, the method comprising:

controlling the braking force applying device based on a target braking split ratio when braking of the electric vehicle by the braking force applying device is performed, the target braking split ratio being a target value of a ratio of the braking force that is applied to the rear wheel by the braking force applying device to a total braking force that is applied to the front wheel and the rear wheel by the braking force applying device; and setting an initial value of the target braking split ratio to a value within an allowable range about the transmission split ratio when braking of the electric vehicle by the braking force applying device is started while the electric vehicle is being braked by the motor.

* * * * *